(12) United States Patent
Palmer

(10) Patent No.: US 11,331,585 B2
(45) Date of Patent: May 17, 2022

(54) SYSTEMS AND METHODS FOR ADVANCED COMPETITIVE VIRTUAL SPORTS COMPETITIONS

(71) Applicant: John Palmer, Indianapolis, IN (US)

(72) Inventor: John Palmer, Indianapolis, IN (US)

( * ) Notice: Subject to any disclaimer, the term of this patent is extended or adjusted under 35 U.S.C. 154(b) by 0 days.

(21) Appl. No.: 16/406,089

(22) Filed: May 8, 2019

(65) Prior Publication Data
US 2020/0353367 A1    Nov. 12, 2020

(51) Int. Cl.
*A63F 13/828*    (2014.01)
*A63F 13/65*     (2014.01)
*A63F 13/30*     (2014.01)

(52) U.S. Cl.
CPC ........... *A63F 13/828* (2014.09); *A63F 13/30* (2014.09); *A63F 13/65* (2014.09); *A63F 2300/69* (2013.01)

(58) Field of Classification Search
CPC ......... A63F 13/828; A63F 13/30; A63F 13/65
See application file for complete search history.

(56) References Cited

U.S. PATENT DOCUMENTS

| 2008/0287198 | A1* | 11/2008 | Callery | G07F 17/32 463/42 |
| 2013/0303268 | A1* | 11/2013 | Miller | A63F 13/12 463/25 |
| 2014/0207840 | A1* | 7/2014 | Smith | H04N 21/8193 709/201 |
| 2019/0371127 | A1* | 12/2019 | Salvati | G07F 17/3288 |

* cited by examiner

*Primary Examiner* — Yingchuan Zhang
(74) *Attorney, Agent, or Firm* — C. John Brannon; Brannon Sowers & Cracraft PC

(57) ABSTRACT

Methods and systems for creating an advanced virtual sports platform over a computer network by establishing and storing input data sources for a real-world competition; receiving, querying, and storing user account credentials from users; querying and generating user leagues the one real-world competition; receiving and storing user teams for the competition user league; operating a live draft for the competition user leagues and teams, including draft timer and nonresponse autopick features; querying and receiving stage data for the competition from input data sources; establishing bonus specifiers for the user leagues; outputting stage data scores; assigning user team points based on the output stage data scores; generating rankings for the user teams; and displaying rankings for the user teams. Other aspects include analyzing the platform data for significant variations between expected and actual performance.

20 Claims, 17 Drawing Sheets

Race Results

GENTLEMEN CONTENDERS

16  17  18  19  20  21  22  23  24

505 { GIRO D'ITALIA STAGE 21
Rome > Rome
Sunday, May 27th o 118.00km o Flat

RESULTS

Stage-by-Stage Results
Real-world points, standings, and timing

⚑ stage ▾     ● individual (GC) ▾

- ● individual (GC)
- ● mountains (KOM)
- ● points
- 🐾 team

Stage 21
Finish position and timing

Rider Results

| Rank | Rider | Time | Bonus |
|---|---|---|---|
| 1 | Sam Bennett | 2:50:49 | - |
| 2 | Elia Viviani | 2:50:49 | - |
| 3 | Jean-Pierre Drucker | 2:50:49 | - |
| 4 | Baptiste Planckaert | 2:50:49 | - |
| 5 | Manuel Belletti | 2:50:49 | - |
| 6 | Sacha Modolo | 2:50:49 | - |
| 7 | Clement Venturini | 2:50:49 | - |
| 8 | Paolo Simion | 2:50:49 | - |

Race Start List

910 → Riders In The 2018 Giro d'Italia
Official rosters for each squad, and riders by country.

[BY TEAM] [BY COUNTRY >]

Riders By Team

This year's Giro is reaching broadly, geographically speaking. Starting in Jerusalem with a 9.7 km (6 mile) individual time trial to sort out the bunch, two stages in Israel will follow. After a rest day, there will be 18 further stages in Italy to reach the finish in Rome.

(SUN) Team Sunweb

920 →
1 BIB NO.  [Flag] Tom Dumoulin  ◎ 8th  👤 27 years old
2 BIB NO.  [Flag] Roy Curvers  ◎ 1,883rd  👤 38 years old
3 BIB NO.  [Flag] Chad Haga  ◎ 768th  👤 30 years old
4 BIB NO.  [Flag] Christopher Hamilton  ◎ 661st  👤 23 years old
5 BIB NO.  [Flag] Lennard Hofstede  ◎ 808th  👤 23 years old
6 BIB NO.  [Flag] Sam Oomen  ◎ 88th  👤 23 years old
7 BIB NO.  [Flag] Laurens Ten Dam  ◎ 1,166th  👤 37 years old
8 BIB NO.  [Flag] Louis Vervaeke  ◎ 1,205th  👤 25 years old AG2R La Mondiale

Riders In The 2018 Giro d'Italia
Official rosters for each squad, and riders by country.

[< BY TEAM] [BY COUNTRY]

Riders By Country

Although teams tend to represent a given country, personal pride in a rider's home country can motivate more than anything else, especially on prestigious holidays.

[Flag] Albania

218 BIB NO.  Eugert Zhupa  WILIER TRIESTINA - SELLE IT...  ◎ 554th  👤 28 years old

[Flag] Argentina

127 BIB NO.  Eduardo Sepulveda  MOVISTAR TEAM  ◎ 1,146th  👤 27 years old

[Flag] Australia

61 BIB NO.  Rohan Dennis  BMC RACING TEAM  ◎ 38th  👤 27 years old
113 BIB NO.  Jack Haig  MITCHELTON - SCOTT  ◎ 200th  👤 27 years old
146 BIB NO.  O'connor Ben  TEAM DIMENSION DATA  ◎ 371th

SYSTEMS AND METHODS FOR ADVANCED COMPETITIVE VIRTUAL SPORTS COMPETITIONS

TECHNICAL FIELD

This novel technology relates to the field of digital sports competitions. More specifically, the present technology is in the technical field of advanced competitive virtual sports competitions based on cycling events.

BACKGROUND

A great deal of time and money is spent attending, support, and otherwise being entertained by sports around the world. However, not every person can attend a sporting match, know every player's statistics, or even watch every game for lack of time, distance from a match, or just general lack of resources; however, fans still wish to keep abreast of these socially binding and entertaining activities.

To this end, some video game developers created sports-themed video games, allowing players to play as their favorite football, basketball, soccer, and hockey teams on their video game consoles. Other developers built upon this concept with video games allowing sports gamers to create their own characters and play as themselves in the games. Still others allowed players to compete against their friends playing as their favorite teams over the Internet and compete throughout the sports season against their friends. These video games are limited by what the game developer, and often the sports league itself, will allow for variation and creativity.

Fantasy sports leagues have started developing over the past few years as well to try to allow more creativity, allowing mock draft picks and leagues; however, such games and leagues are greatly limited by geographic location; availability of other league participants; understanding of mock league rules and barriers to entry; and selection for lesser popularity sports and leagues. Thus, what is needed is a more diverse and dynamic platform that affords greater inclusivity and lower barriers to entry for such sports fans, while increasing retention and immersion.

The present novel technology addresses these needs.

BRIEF DESCRIPTION OF THE DRAWINGS

FIG. 8 depicts a sixth interface of the advanced fantasy sports platform, specifically of results view.

FIG. 9A depicts a seventh interface of the advanced fantasy sports platform, specifically of starting list view.

FIG. 9B depicts another screen associated with the seventh interface of the advanced fantasy sports platform.

Like reference numbers and designations in the various drawings indicate like elements.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not. Additionally, "generates," "populates," "generating," and "populating" mean that the advanced sports platform 105, client, end user (user, system user), and/or module may produce some event or cause some event element to be produced. For example, a webpage may receive data to display in whole or in part to display a fantasy sports league, users of sports platform 105, current standings for one or more leagues, and/or the like; the webpage may pull such data from a source other than the advanced sports platform 105 (e.g., other servers, intermediaries, etc.); or the advanced sports platform 105 may entirely provide the valuation estimate to be produced on the webpage.

Figure 1:
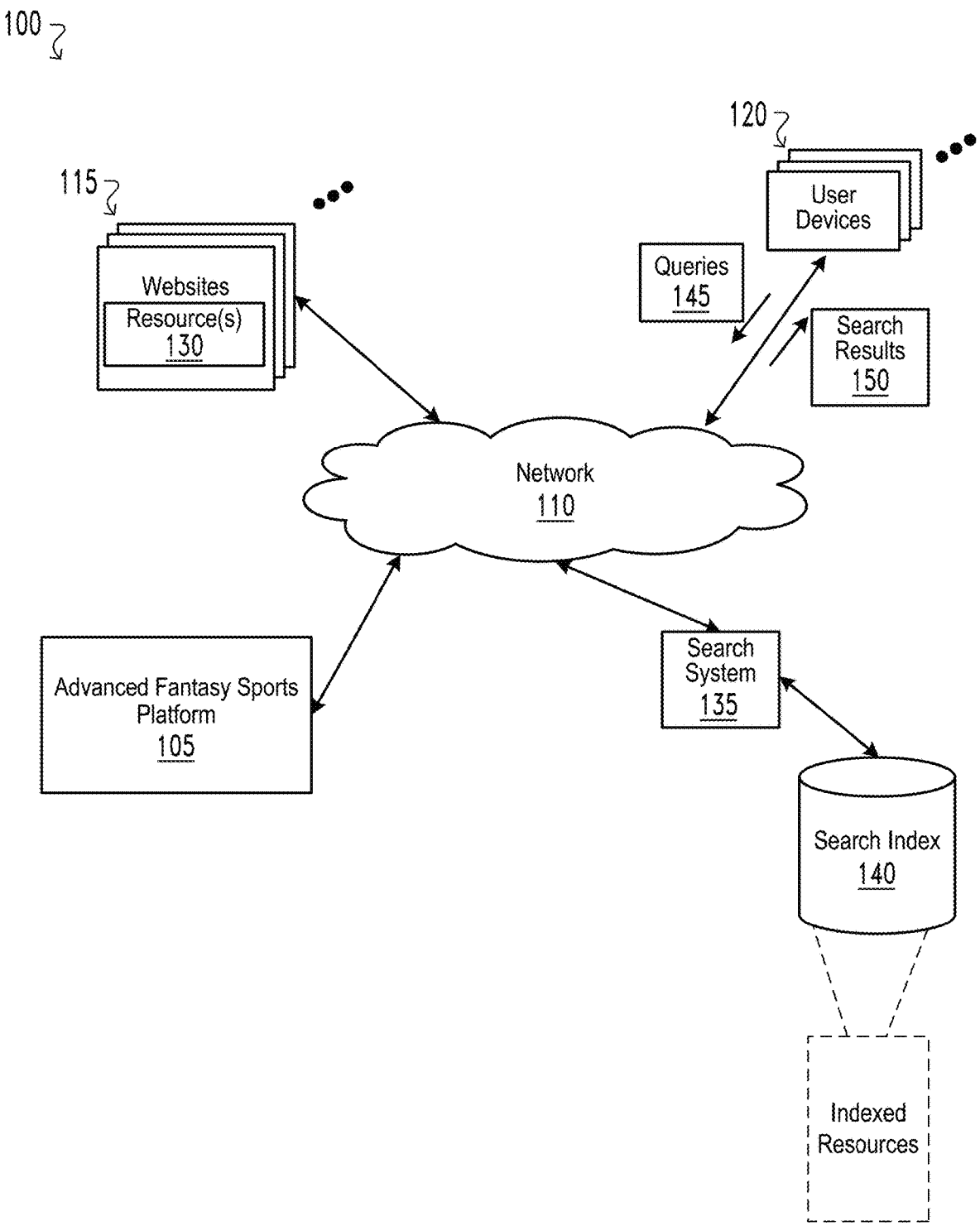
FIG. 1 is a block diagram of an example environment in which the advanced fantasy sports platform may exist.

FIG. 1 is a block diagram of an example environment 100 in which advanced sports platform 105 may exist. Environment 100 may typically include advanced sports platform 105; network 110; website(s) 115; end user device(s) 120; resource(s) 130; search system 135; search index 140; queries 145; search result(s) 150; and system database(s) 180. Advanced sports platform 105 may facilitate creation and use of an advanced virtual/fantasy sports platform, which typically may be focused on real-world cycling competitions. Example environment 100 also includes network 110, such as a local area network (LAN), a wide area network (WAN), the Internet, or a combination thereof. Network 110 may connect websites 115, end user device(s) 120, and/or advanced sports platform 105. Example environment 100 may potentially include many thousands of website(s) 115 and/or end user device(s) 120.

Website(s) 115 may be one or more resources 130 associated with a domain name and hosted by one or more servers. An example website(s) 115 may be a collection of webpages formatted in hypertext markup language (HTML) that may contain text, images, multimedia content, and programming elements, such as scripts. Each website(s) 115 may be maintained by a publisher, which may be an entity that controls, manages, and/or owns each website(s) 115. Such websites 115 may include sports data, sports news, competition rules, weather forecasts, historical data, and/or the like.

Resource(s) 130 may be any data that may be provided over the network 110. A resource(s) 130 may be identified by a resource address (e.g., a URL) that may be associated with the resource(s) 130. Resources 130 include HTML webpages, word processing documents, and portable document format (PDF) documents, images, video, and feed sources, to name only a few. Such resources 130 may include content, such as words, phrases, images and sounds, that may include embedded information—such as meta-information in hyperlinks—and/or embedded instructions, such as JAVASCRIPT scripts (JAVASCRIPT is a registered trademark of Sun Microsystems, Inc., a Delaware corporation, located at 4150 Network Circle Santa Clara, Calif. 95054). Units of content—for example, data files, scripts, content files, or other digital data—that may be presented in (or with) resources may be referred to as content items.

End user devices 120 may be electronic devices that may be under the control of an end user and may be capable of requesting and receiving resources 130 over network 110. Example end user devices 120 include personal computers, mobile communication devices, and other devices that may send and receive data over the network 110. End user devices 120 typically include a user application, such as a web browser, to facilitate the sending and receiving of data over the network 110. As user-devices 120 typically may be operated by users, such may be referred to as interchangeable in some cases.

In some implementations, websites 115 (apps, client services; hereinafter simply "websites" for ease of use), end user devices 120, and system 105 may directly intercommunicate, excluding the need for the Internet from the scope of a network 110. For example, the websites 115, end user devices 120, and the advanced sports platform 105 may directly communicate over device-to-device (D2D) communication protocols (e.g., WI-FI DIRECT (WI-FI DIRECT is a registered trademark of Wi-Fi Alliance, a California corporation, located at 10900-B Stonelake Boulevard, Suite 126, Austin, Tex. 78759); Long Term Evolution (LTE) D2D (LTE is a registered trademark of Institut Européen des Normes; a French nonprofit telecommunication association, located at 650 route des Lucioles, F-06921, Sophia Antipolis, France), LTE Advanced (LTE-A) D2D, etc.), wireless wide area networks, and/or satellite links thus eliminate the need for the network 110 entirely. In other implementations, the websites 115, end user devices 120, and system 105 may communicate indirectly to the exclusion of the Internet from the scope of the network 110 by communicating over wireless wide area networks and/or satellite links. Further, end user devices 120 may similarly send and receive search queries 145 and search results 150 indirectly or directly.

In wireless wide area networks, communication primarily occurs through the transmission of radio signals over analog, digital cellular, or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM) (GSM is a registered trademark of GSM MoU Association, a Swiss association, located at Third Floor Block 2, Deansgrande Business Park, Deansgrande, Co Dublin, Ireland), Third Generation (wideband or 3G), Fourth Generation (broadband or 4G), personal digital cellular (PDC), or through packet-data technology over analog systems such as cellular digital packet data (CDPD) used on the Advance Mobile Phone System (AMPS).

The terms "wireless application protocol" and/or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Sun Microsystems, Inc. of Santa Clara, Calif.), BREW (BREW is a registered trademark of Qualcomm Incorporated of San Diego, Calif.), WINDOWS Mobile (WINDOWS is a registered trademark of Microsoft Corporation of Redmond, Wash.), PALM OS (PALM is a registered trademark of Palm, Inc. of Sunnyvale, Calif.), SYMBIAN OS (SYMBIAN is a registered trademark of Symbian Software Limited Corporation of London, United Kingdom), ANDROID OS (ANDROID is a registered trademark of Google, Inc. of Mountain View, Calif.), and IPHONE OS (IPHONE is a registered trademark of Apple, Inc. of Cupertino, Calif.). "Mobile Apps" refers to software programs written for execution with Mobile Software.

The advanced sports platform 105 may use one or more modules to perform various functions including, but not limited to, searching, analyzing, querying, interfacing, etc. A "module" refers to a portion of a computer system and/or software program that carries out one or more specific functions and may be used alone or combined with other modules of the same system or program. For example, a module may be located on the advanced sports platform 105 (e.g., on the servers of system 105, i.e., server-side module), on end user devices 120, or on an intermediary device (e.g., the client server, i.e., a client-side module; another end user device(s) 120; a different server on the network 110; or any other machine capable of direct or indirect communication with system 105, websites 115, the search system 135, and/or the end user devices 120.)

In some implementations, the system 105 may be performed through a system 105 module. For example, a user may install a program to interface with a system 105 server to communicate data, interactions, etc. from the virtual cycling platform 105 to the user's end user device(s) 120. In some other implementations, the system 105 may be installed on a user's machine and operate—in whole or in part—independently of system 105 WAN and/or LAN components. For example, the system 105 software may be deployed to a user's computer as a standalone program that interfaces with the user's computer, creates and maintains sports leagues and user profiles, generates standings, parses third-party data, etc. In another example, the system 105 may interact with and/or be installed as an Internet browser extension. For example, the system 105 may be a program installed as an extension, add-on, and/or plugin of GOOGLE CHROME (GOOGLE CHROME is a registered trademark of Google, Inc., a Delaware corporation, located at 1600 Amphitheatre Parkway, Mountain View, Calif. 94043); MOZILLA FIREFOX (MOZILLA and FIREFOX are registered trademarks of the Mozilla Foundation, a California non-profit corporation, located at 313 East Evelyn Avenue, Mountain View, Calif. 94041); APPLE SAFARI (APPLE and SAFARI are registered trademarks of Apple, Inc., a California corporation, located at 1 Infinite Loop, Cupertino, Calif. 95014), etc. The browser extension may query an entered league/athlete, query and match for the league/athlete, communicate with data store(s), analyze standings and season status, communicate with secondary data store(s) for potential extrapolated standing figures, generate expected standings, present the user(s) with a generated standing list and user positions, etc.

Typically, modules may be coded in JAVASCRIPT, PHP, or HTML, but may be created using any known programming language (e.g., BASIC, FORTRAN, C, C++, C #, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, the advanced sports platform 105 may be packaged, distributed, scripted, installed by a technician of system 105, and/or otherwise deployed to a client server location such that system 105 exists within the client server and/or client server network, either in whole or in part. For example, the advanced sports platform 105 may be scripted and/or packaged into an executable package and downloaded by a client administrator; the client administrator then installing system 105 software package(s) onto the client server(s). Such setups may allow the advanced sports platform 105 to operate all system 105 operations entirely within the client server(s) and/or client network, excluding the need to interface with system 105 provider's servers for some or all system 105 functions. Such an implementation may, for example, be used to reduce bandwidth, latency, complexity of network management, etc. In some other implementations, the client servers may facilitate only some of system 105 functions and interface with system 105 servers (over a network or directly) to enable those remaining functions. Still other implementations may link to system 105 servers to obtain updates, patches, and/or other modifications to system 105 distributions.

Advanced sports platform 105 software distributions may, in some implementations, be installed in a virtual environment (e.g., HYPER-V (HYPER-V is a registered trademark of Microsoft, a Washington Corporation, located at One Microsoft Way, Redmond, Wash. 98052); VIRTUALBOX (VIRTUALBOX is a registered trademark of Oracle America, Inc., a Delaware corporation, located at 500 Oracle Parkway, Redwood Shores, Calif. 94065); VMWARE (VMWARE is a registered trademark of VMWare, Inc., a Delaware corporation, located at 3401 Hillview Ave., Palo Alto, Calif. 94304), etc.).

In other implementations, advanced sports platform 105 software may be installed in whole or in part on an intermediary system that may be separate from the client and system 105 servers. For example, advanced sports platform 105 software may be installed by an intermediary worker, a client worker, and/or a system 105 worker onto a hosting service (e.g., AMAZON WEB SERVICES (AWS) (AWS is a registered trademark of Amazon Technologies, Inc., a Nevada corporation, located at PO Box 8102, Reno, Nev. 89507), RACKSPACE (RACKSPACE is a registered trademark of Rackspace US, Inc., a Delaware corporation, located at 1 Fanatical Place, City of Windcrest, San Antonio, Tex. 78218), etc. The client may then connect to the intermediary and/or system 105 servers to access system 105 functions. Such implementations may, for example, allow distributed access, redundancy, decreased latency, etc.

End user device(s) 120 may request resources 130 from website(s) 115. In turn, data representing resource(s) 130 may be provided to end user device(s) 120 for presentation by end user device(s) 120. Data representing resource(s) 130 may also include data specifying a portion of the resource(s) 130 or a portion of a user display—for example, a small search text box or a presentation location of a pop-up window—in which advertisements or third-party search tools may be presented.

To facilitate searching of resource(s) 130, environment 100 may include a search system 135 that identifies resource(s) 130 by crawling and indexing resource(s) 130 provided by publishers on website(s) 115. Data about resource(s) 130 may be indexed based on resource(s) 130 to which the data corresponds. The indexed and, optionally, cached copies of resource(s) 130 may be stored in, for example, search index 140.

End user device(s) 120 may submit search queries 145 to search system 135 over network 110. In response, search system 135 accesses search index 140 to identify resource(s) 130 that may be relevant to search query 145. Search system 135 identifies the resources 130 in the form of search result(s) 150 and returns the search result(s) 150 to end user devices 120 in search results webpages. A search result(s) 150 may be data generated by the search system 135 that identifies a resource(s) 130 that may be responsive to a particular search query, and includes a link to the resource(s) 130. An example search result(s) 150 may include a webpage title, a snippet of text or a portion of an image extracted from the webpage, and the URL of the webpage.

Users that may be interested in a particular subject may perform a search by submitting one or more queries 145 to search system 135 in an effort to identify related information. For example, a user that may be interested sports may submit queries 145 such as "news," "sports," or "technology." In response to each of these queries 145, the user may be provided search result(s) 150 that have been identified as responsive to the search query—that is, have at least a minimum threshold relevance to the search query, for example, based on cosine similarity measures or clustering techniques. The user may then select one or more of the search result(s) 150 to request presentation of a webpage or other resource(s) 130 that may be referenced by a URL associated with the search result(s) 150.

Other implementations of the advanced sports platform 105 may allow for a game-like components, or gamification, aspect to interaction with system 105. For example, tangible (e.g., money, goods, etc.) and/or intangible (e.g., account badges, user name flair, etc.) rewards may be given to users who donate money to system 105, users voted most active on system 105, etc.

When search result(s) 150 are requested by an end user device(s) 120, the advanced sports platform 105 may receive a request for data to be provided with the resource(s) 130 or search results 150. In response to the request, the advanced sports platform 105 selects data that are determined to be relevant to the search query. In turn, the selected data are provided to the end user device(s) 120 for presentation with the search results 150.

The environment 100 may also include a system database(s) 180 to receive and record information regarding the advanced sports platform 105, website(s) 115, end user devices 120, and/or any other data useful to environment 100. For example, information regarding end user devices 120 and end user identifiers may be stored and analyzed to determine user activity on website(s) 115 and/or system 105.

In some implementations, data that may be stored in the system database(s) 180 may be anonymized to protect the identity of the user with which the user data may be associated. For example, user identifiers may be removed from the user data to provide to third-party clients. Alternatively, the user data may be associated with a hash value of the user identifier to anonymize the user identifier. In some implementations, data are only stored for users that opt-in to having their data stored. For example, a user may be provided an opt-in/opt-out user interface that allows the user to specify whether they approve storage of data associated with the user.

While system 105 may operate with only one of each component (e.g., one system 105, one website 115, one end user, one end user device 120, etc.), system 105 may be benefitted by multiple of these components (and/or in some instances greatly benefitted by a mass amount of said components). For example, the existence and activity of a plurality of users on system 105 may foster greater creativity and flexibility of feedback to system 105 as compared to creative and intellectual stagnation that may typically occur with a small user base. Additionally, features such as game-like interaction of system 105 may be difficult or impossible without at least a small plurality of active competitors on system 105; however, as the number of active users increases, the likelihood of a successful ecosystem for the game-like system 105 features also increases and may tend to lead to greater success of system 105 and user activity (quantity and quality) compared to a small user base.

Figure 2:
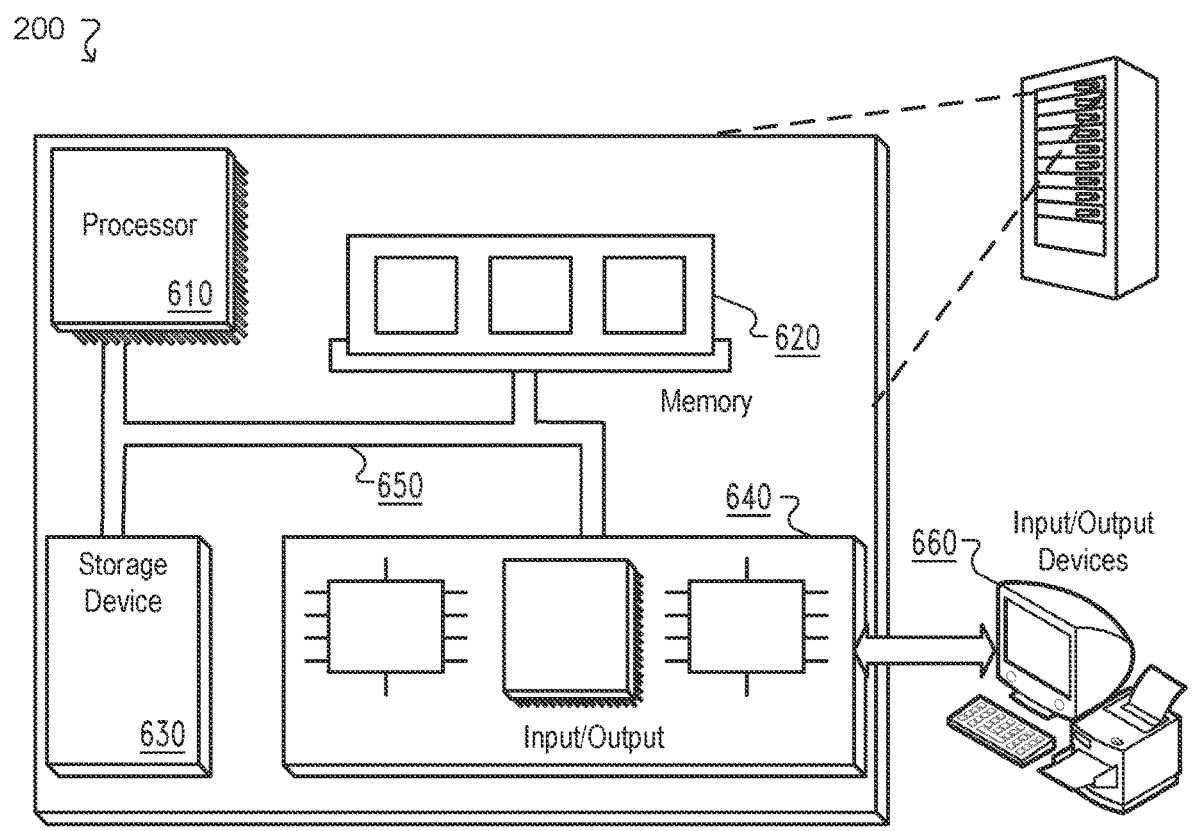
FIG. 2 is a system diagram of an example computer system that may be used to create the advanced fantasy sports platform.

FIG. 2 is a block diagram of an example computer system 200 that may be used to provide virtual sports platform 105, as described above. The system 200 may typically include processor(s) 210; memory 220; storage device(s) 230; system input(s)/output(s) 240; system bus(es) 250; and input/output device(s) 260. Each of the components 210, 220, 230, and 240 typically may be interconnected, for example, using system bus(es) 250. Processor(s) 210 may be capable of processing instructions for execution within the system 200. In one implementation, processor(s) 210 may be a single-threaded processor. In another implementation, processor(s) 210 may be a multi-threaded processor. In yet another implementation, processor(s) 210 may be a single-core processor, a multiple-core processor, and/or multiple processors (i.e., more than one socketed processor). Processor(s) 210 typically may be capable of processing instructions stored in the memory 220 and/or on the storage device(s) 230.

Memory 220 stores information within system 200. In one implementation, memory 220 may be a computer-readable medium. In one other implementation, memory 220 may be a volatile memory unit. In another implementation, memory 220 may be a nonvolatile memory unit.

Storage device(s) 230 may be capable of providing mass storage for the system 200. In one implementation, storage device(s) 230 may be a computer-readable medium. In various different implementations, storage device(s) 230 may include, for example, a hard disk device, a solid-state disk device, an optical disk device, and/or some other large capacity storage device.

System input(s)/output(s) 240 provide input/output operations for the system 200. In one implementation, system input(s)/output(s) 240 may include one or more of a network interface devices, for example an Ethernet card; a serial communication device, for example an RS-232 port; and/or a wireless interface device, for example an IEEE 802.11 card. In another implementation, system input(s)/output(s) 240 may include driver devices configured to receive input data and send output data to other input/output device(s) 260, for example keyboards, printers, display devices, and/or any other input/output device(s) 260. Other implementations, however, may also be used, such as mobile computing devices, mobile communication devices, set-top box television client devices, etc.

Although an example processing system has been described in FIG. 1, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium may not be a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, for example an field programmable gate array (FPGA) or an application-specific integrated circuit (ASIC). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a computer are a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk real-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, Wash. 98052), IPOD (IPOD is a registered trademark of Apple Inc., a California corporation, located at 1 Infinite Loop, Cupertino, Calif. 95014), XBOX (e.g., XBOX, XBOX ONE) (XBOX and XBOX ONE are a registered trademarks of Microsoft, a Washington corporation, located at One Microsoft Way, Redmond, Wash. 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, Calif. 90949), WII (e.g., WII, WII U) (WII and WII U are registered trademarks of Nintendo of America Inc., a Washington corporation, located at 4600 150th Avenue NE, Redmond, Wash. 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that may be used by the user; for example, by sending webpages to a web browser on a user's client device in response to requests received from the web browser.

Some embodiments of the subject matter described in this specification may be implemented in a computing system 200 that includes a back-end component (e.g., a data server) or that includes a middleware component (e.g., an application server) or that includes a front-end component (e.g., a client computer having a graphical user interface or a Web browser through which a user may interact with an implementation of the subject matter described in this specification) or any combination of one or more such back-end, middleware, or front-end components. The components of the computing system 200 may be interconnected by any form or medium of digital data communication, for example a communication network. Examples of communication networks include a local area network (LAN) and a wide area network (WAN), an inter-network (e.g., the Internet), and peer-to-peer networks (e.g., ad-hoc peer-to-peer, direct peer-to-peer, decentralized peer-to-peer, centralized peer-to-peer, etc.).

The computing system 200 may include clients and servers. A client and server are typically remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

Figure 3:
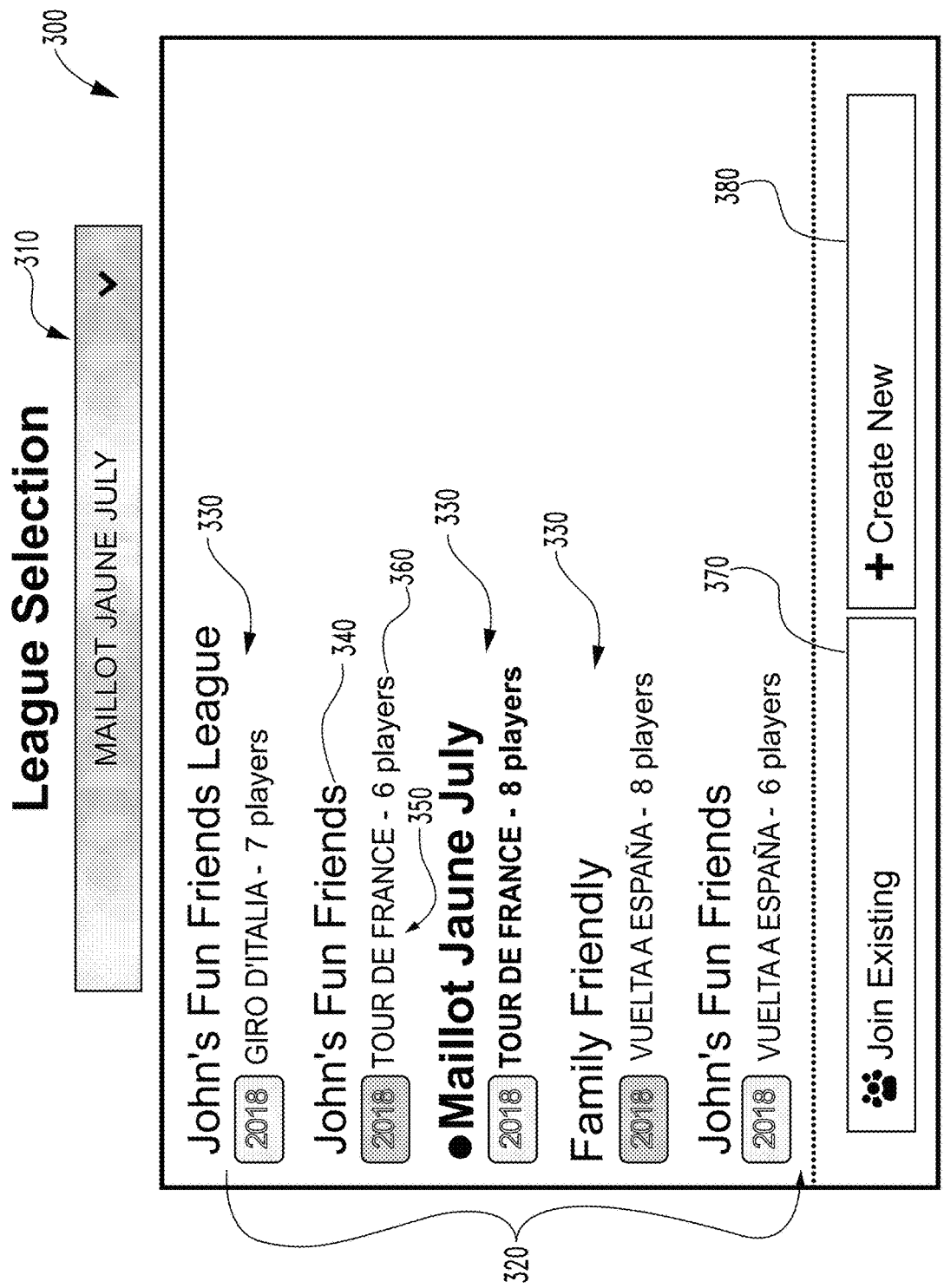
FIG. 3 depicts a first interface of the advanced fantasy sports platform, specifically during a league selection.

FIG. 3 depicts league selection screen 300, which may typically include league event selector 310, user leagues listings 320, user league 330, user league name 340, league event 350, user league participants 360, join existing user league 370, and/or create new user league 380.

League selection screen 300 typically may be presented to a user when connecting to platform 105 and viewing, joining, and/or creating a user league 330 for a league event 350. For example, as depicted in FIG. 3, a user may be presented with a league event selection dropdown 310, which then typically may query databases 180 and populate user leagues listing 320 with user leagues 330. User leagues 330 typically may be the leagues created under the event selected from selector 310.

User leagues 330 further may display relevant information in reference to the league 330, including but not limited to, user league name 340, league event 350, user league participants 360, and/or the like. For example, a user league 330 may have a league name 340 of "The Honorable Humdingers," with ten user league participants 360, and corresponding to a league event 350 of "TOUR DE FRANCE," (TOUR DE FRANCE is a registered trademark of SOCIETE DU TOUR DE FRANCE, a French corporation, located at 253 quai de la bataille de Stalingrad, Issy Les Moulineaux, France 92130), "GIRO D'ITALIA," (GIRO D'ITALIA is a registered trademark of LA GAZZETTA DELLO SPORT SOCIETA'EDITRICE A R. L., an Italian corporation, located at Piazza Santa Maria delle Grazie, 1 Milan, Italy), "VUELTA A ESPAÑA" (VUELTA A ESPAÑA is a trademark of AMAURY SPORT ORGANISATION, a French corporation, located at Quai Ouest, 40-42 Quai du point du Jour, 92100 Boulogne Billancourt, France), and/or the like.

If a user 120 wishes to join an existing user league 330 from the user league listings 320, he or she may select said league 330 from listing 320 and click, tap, and/or otherwise select join existing user league indicator 370. In some implementations, this may automatically add the user to the selected user league 330, direct the user to provide more information to be reviewed by the user league 330 before being admitted, provide a passcode to join the user league 330, and/or the like.

Where a user does not see a league 330 that he or she wishes to join, or simply wishes to create a new user league 330, he or she may select create new user league indicator 380. Typically, this may direct the user to provide information about the user league 330, such as user league name 340, league event 350, user league participants 360, a user league icon, a list of members to email to join, certain rules specific to the user league 330, payment information for paid leagues, and/or the like. This new user league 330 may then be automatically added to the platform 105 so that other users may view and join the new user league 330 and/or the league 330 may be submitted for review by platform 105. Such review may, for example, filter out duplicates, spam, harassment, and/or the like.

Figure 4:
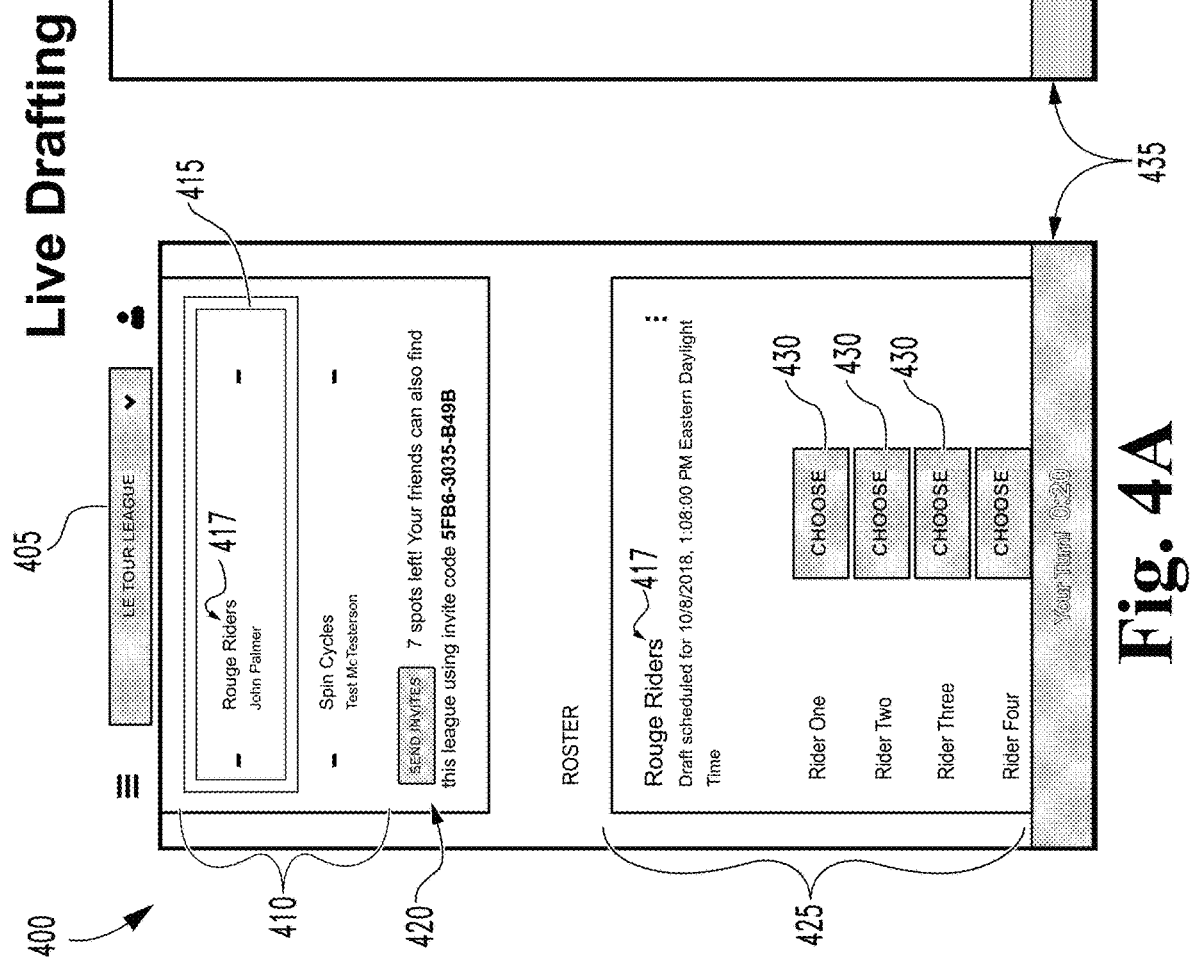
FIG. 4A depicts a second interface of the advanced fantasy sports platform, specifically during a live draft.
FIG. 4B depicts another screen associated with the second interface of the advanced fantasy sports platform.

FIGS. 4A-4B depict platform live draft features, typically including live draft screen 400, user league selector 405, team listings 410, user team 415, user team identifiers 417, invitation selector 420, user team drafting listing 425, team drafting selector 430, drafting timer 435, team member search screen 440, athlete listings 445, and/or athlete 450.

FIG. 4A typically depicts a first example live draft screen 400 for a user league 330 selected by user league selector 405 (and/or selected from a listing of user leagues 330 on platform 105 in which user is joined). Live draft screen 400 typically acts as a turn-based, time-dependent athlete selection system for platform 105 for users in user league 330 to select team members (e.g., athletes, teams, etc.) in an organized and efficient manner. One or more team listings 410 are typically populated from platform datastores 180 and/or other data sources associated with user league 330, typically including one or more user teams 415. These user teams 415 further may be associated with a platform 105 user and be displayed with one or more user team identifiers 417 (e.g., user team name 417).

In some implementations, functionality to use one or more invitation selectors 420 may be provided, which typically may act to invite other individuals internal and/or external to platform 105 to create their own user teams 415 in the user league 330. For example, as depicted in FIG. 4A, a "Send Invites" button 420 may be generated and displayed to users, along with the remaining open spots in the user league 330, an invitation code to find the league 330, a code to join the league 330, and/or the like.

In still further implementations, as depicted in FIG. 4A, one or more user team drafting listings 425 typically may be generated and displayed for the user during the live draft. This effectively becomes the user team 415 roster at the end of the live draft. The roster listing 425 typically may include one or more, but typically at least several, roster selectors 430 and drafting timer 435. Typically, in some implementations, during a predetermined and/or user-league 330 decided time, user teams 415 in user league 330 may progress through the user leagues 330, selecting one or more picks (e.g., athletes, teams, etc.), then typically looping back to the top once all user teams 415 have made their pick(s). Users 120 typically may enter their pick, select from a list of athletes/picks (e.g., on team member search screen 440 of FIG. 4B), and/or otherwise select their pick within their allotted time to make his or her draft pick. This allotted time typically may be a predetermined period of time (e.g., ten seconds, thirty seconds, one minute, etc.), and may typically be generated and displayed to users (e.g., on drafting timer 435).

In further implementations, in order to improve the efficiency and flow of the live draft process, which presently faces issues of user lag, nonattendance, inexperience lag, and/or other interconnection factors that occur during such live drafting, advanced sports platform 105 may also implement an auto-pick system, by which nonresponsive users are automatically assigned one or more picks at the end of the time limit.

For example, system 105 may rank potential picks according to a variety of factors (e.g., real-world rank, age, expected growth potential, salary, weather-conditioned performance, etc.) and then for assign the next-highest pick of the remaining picks. In other implementations, system 105 may pick the lowest-ranked picks and assign the nonresponsive user team 415 these low-ranked picks. In still other implementations, system 105 may temporarily select higher ranked picks, but allow responsive user teams 415 to steal those temporary picks, in some implementations unless the nonresponsive user team 415 verifies those picks and converts the temporary draft picks to permanent picks. Accordingly, the advanced sports platform 105 may implement a novel, more immersive and authentic live drafting experience than currently exists in the art, saving time and resources, increasing responsiveness of the platform 105 as a whole, and improving overall satisfaction and repeat involvement.

In some implementations, user leagues 330 may be structured to provide a first join-first pick system, a system based on historical performance of users in an associated league, a system based on cost-benefit ranking (i.e., where users pay with money or other value to have a higher rank, and thus earlier pick), and/or the like. In such an implementation, users within a user league 330 may jockey for the best position, increase the spirit of competition with the league 330, and increase potential rewards for performance within the league 330 (e.g., where users are compensated according to a compensation scheme, where the scheme varies based on user involvement and investment, etc.).

In still further implementations, users may preselect one or more preference pick lists, which may select the next highest preference pick for the user. In some instances, this may allow the live draft process to be more fluid, avoiding potential draft lag. In other instances, active involvement in the live draft may be required, and the preference pick may still need to be verified by an active participant, or else the nonresponsive user team 415 may receive a platform 105 autopick.

As noted above, FIG. 4B depicts team member search screen 440, athlete listings 445, and/or picks 450 (e.g., teams, athletes, etc.). Search screen 440 may, for example, be navigated to via the platform 105 interface, and/or may be generated and displayed during a user league 330 live drafting event when a user clicks on one or more draft selectors 430. Picks listing 445 typically may include one or more potential draft picks 450 that are available to be selected for user's team 415. In some implementations, search list 445 may remove already selected picks 450 in league 330 and/or may otherwise indicate these picks' status (e.g., by being struck through, shaded, etc.).

Figure 5:
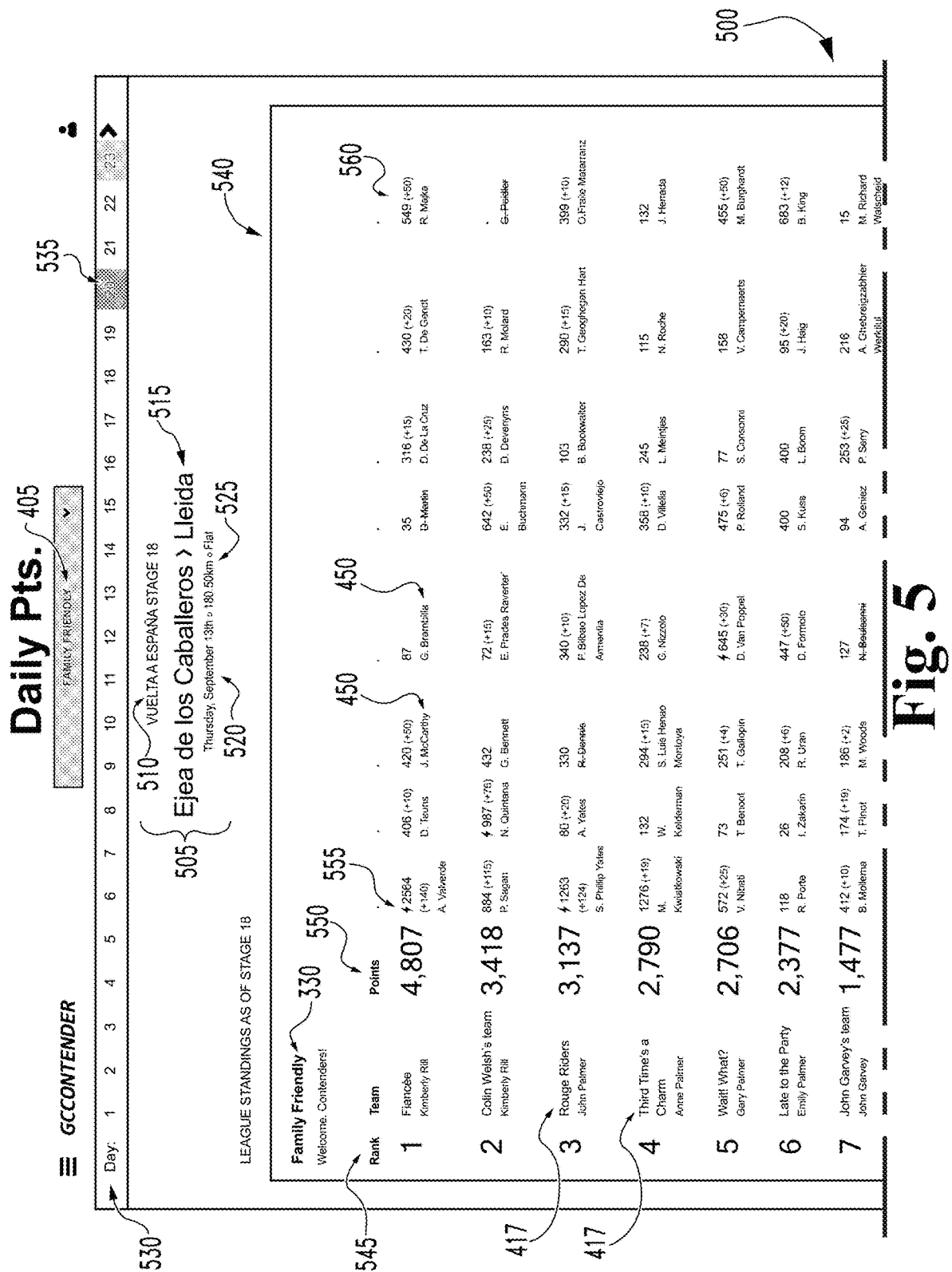
FIG. 5 depicts a third interface of the advanced fantasy sports platform, specifically of a daily scoring interface.

FIG. 5 typically depicts daily points screen 500, which may typically include daily event 505, daily event identifier 510, daily event location 515, daily event time 520, daily event details 525, day listings 530, day selection 535, daily points matrix 540, user team rank 545, user team points 550, bonus point indicator 555, and/or point performance differential 560.

Daily points screen 500 typically may generate and display current standings, ranks, and points associated with user league 330, typically with regard to a specific subpart in the user league 330 competition. As depicted in FIG. 5, such a specific subpart may be denoted as daily event 505, which typically may also include information such as, but not limited to, daily event identifier 510, daily event location 515, daily event time 520, and/or daily event details 525. For example, specific event 505 may be a certain stage of a race (e.g., "VUELTA A ESPANA stage 18" as identifier 510), a start-end location identifier for event 515 (e.g., "Ejea de los Caballeros>Lleida"), a date/time for the event time 520 (e.g., "Thursday, September 13th"), and/or further details 525 (e.g., weather, geography, historical statistics, etc.) for event 505 (e.g., "180.50 km—Flat").

Time listings 530 typically may depict one or more time selections 535, which in FIG. 5 are depicted as day listings 530 and day selection 535. For example, where a league event is divided over multiple days, subevents, and/or the like, time selection 535 may be used to drill down and select one or more of those subevents.

Daily points matrix 540 typically may show points information for user teams 415 on user league 330, typically with reference to one or more user team identifiers 417 (e.g., user team name 417). User teams 415 typically may be ranked using one or more user team ranks 545 based on cumulative, and/or per stage, points (for example, as depicted with user team points 550).

Score matrix 540 may also depict bonus point indicators 555 next to one or more user picks 450, which typically may augment the user league 330's scoring matrix so as to provide bonus points for a certain picked athlete 450 (bonus picking process described elsewhere in this application). Further, one or more point performance differentials 560 may be generated and displayed to indicate per-round gains and/or losses for the user team 415, picks 450, and/or the like.

Figure 6:
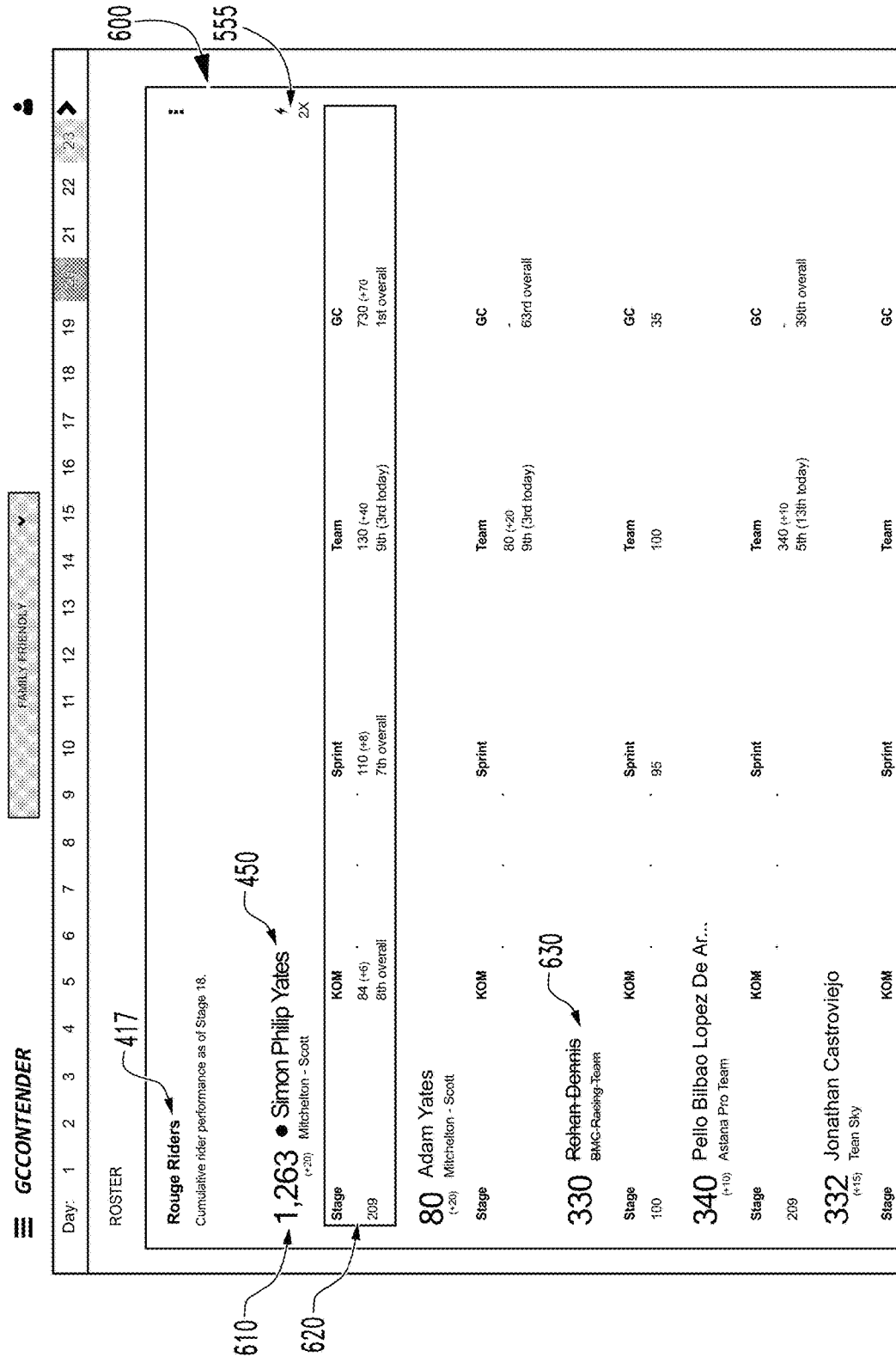
FIG. 6 depicts a fourth interface of the advanced fantasy sports platform, specifically of a roster view.

FIG. 6 depicts user team roster screen 600, which typically may include athlete score 610, athlete performance data 620, and/or excluded athlete 630. User roster screen 600 typically may generate and display picks 450 associated with one or more user team 415, although more typically in association with one user team 415. Picks 450 may usually be arranged by name, score (e.g., athlete score 610 as depicted in FIG. 6), expected:actual performance, position, and/or the like.

In some implementations, each pick 450 may be expanded to give more information regarding pick 450's performance data 620, such as their current location, points, best condition, points per stage/game, percentage contribution to user team 415 score, rank in real-world performance, and/or the like. Pick bonus 555 may also be depicted with pick 450 and/or performance data 620, which typically may allow for fast and efficient cross reference of current bonus pick 555 status and potential changes needed thereto to optimize scoring potential.

Further, in some implementations, roster 600 may depict the current status of a pick 450, including their health, expected recovery date, and/or the like. As depicted in FIG. 6, an excluded athlete pick 630 may indicate that pick 450 is injured, disqualified, and/or otherwise no longer in contention to contribute to user team 415 scoring.

Figure 7:
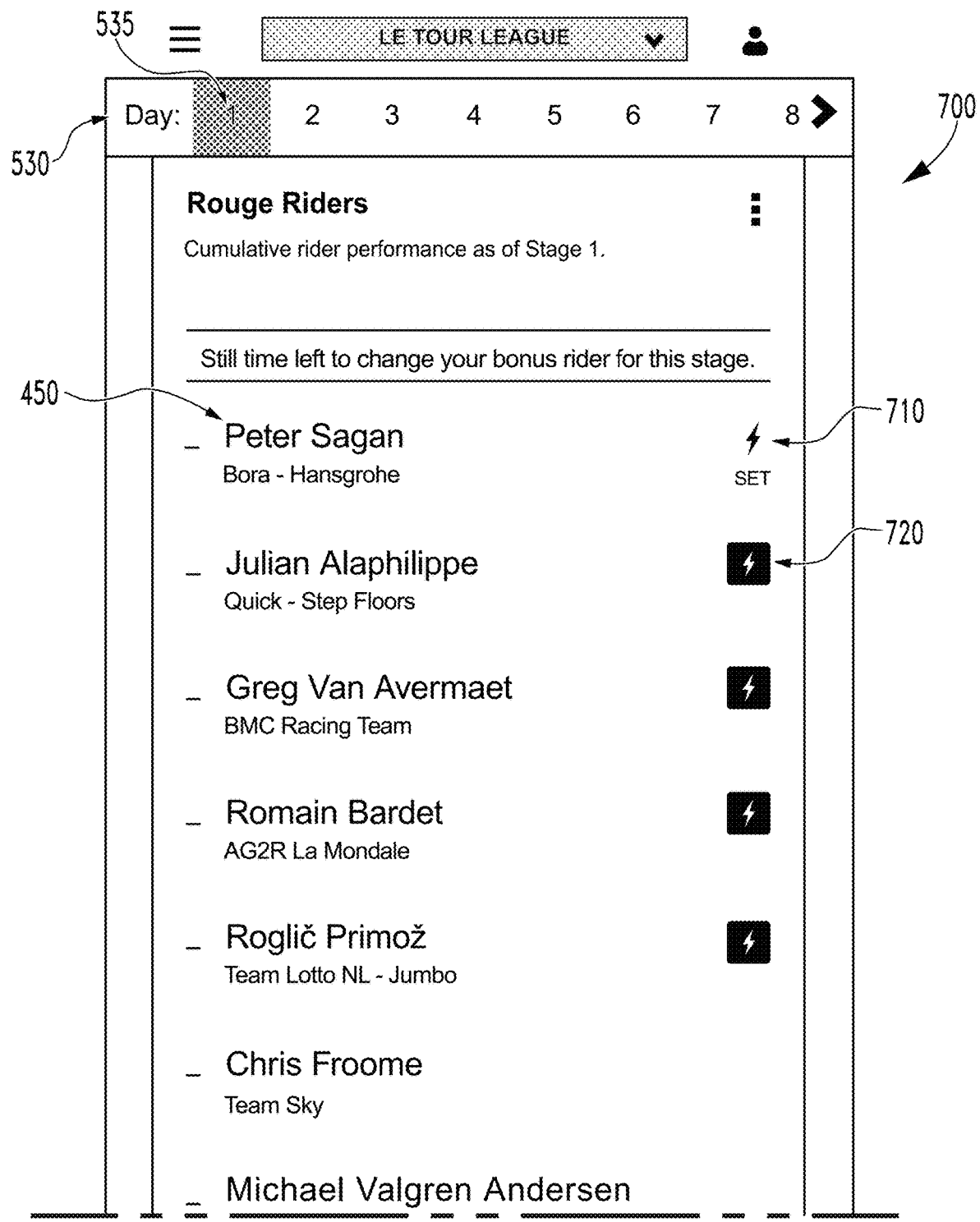
FIG. 7 depicts a fifth interface of the advanced fantasy sports platform, specifically of a bonus points interface.

FIG. 7 depicts bonus points selection screen 700, bonus selection status 710, bonus selected 720, and/or bonus selector 730. Bonus selection screen 700 typically may be generated and displayed to platform 105 users with one or more user team 415 rosters for one or more user leagues 315. Bonus selected 720 typically may denote which one or more picks 450 have been assigned a bonus (and/or what type of bonus is selected). Bonus selector 730 typically may denote other bonus selections to be made and/or alternative options to which to switch currently selected bonus selected picks 450.

Bonus modifiers typically may be one or more augmentations to the scoring system used by platform 105 and/or user league 315. For example, bonus modifiers may multiply stage points, escalate point accrual based on streaks, increase a pick 450's scoring scaled against the performance (or nonperformance of another user team 415's pick 450), and/or the like.

In some implementations, bonuses may be static, where each user is given one or more bonus to assign to picks 450. In other implementations, bonuses may be dynamic and/or rotating, where bonuses differ by user, are awarded to users based on certain rotations and/or factors (e.g., events, holidays, contributions to platform 105, activity on platform 105, historical performance of user, etc.). For example, a static bonus may be a two-times multiplier on points accumulated for a stage, or for a set of rounds, and a dynamic bonus might increase linearly, exponentially, and/or otherwise for a pick 450's performance streak, personal records, and/or the like.

In some further implementations, one or more rewards from platform 105 may be used to purchase, trade, and/or otherwise acquire bonuses on platform 105. For example, users may purchase bonuses with real-world currency, external digital currencies, platform 105 digital currencies, cryptocurrencies, and/or the like. In some implementations, such transactions may be stored in one or more blockchains and/or the like. In still further implementations, databases 180 may be substituted for one or more blockchains and/or the like.

FIG. 8 depicts daily event results screen 800, daily event result selector 810, daily event result subselection 820, daily event athlete listings 830, and/or athlete daily event performance 840.

Daily events results screen 800, as depicted in FIG. 8, typically may display real-world results and scoring associated with user league 330 and/or user team 415. For example, after selecting a subevent using selector 535, platform 105 may query, generate, and display information relevant to that subevent.

Event result selector 810 typically may present one or more options to a user (depicted as a dropdown in FIG. 8 to select a stage event) and then the interface typically may update event result subselection 820 to relevant subselections of the event 350. For example, as depicted on FIG. 8, stage 810 subevents 820 may be individual performance data, mountain data, points data, and/or team data. After selecting one or more of these subselections 820, platform 105 typically may again query, generate, and display data relevant to the selections (e.g., athlete 450 points, team timings, points to each user in individual portion, etc.), for example, but not limited to, in daily event performance 840 field as depicted in FIG. 8.

FIGS. 9A-9B depict event team-athlete listing screen 900 and event country-athlete listing screen 930, which typically may include event information 910, real-life team roster 920, and/or real-life country-athlete listing 940. Typically, listing screens 900 and 930 may be generated and displayed with respect to one or more events on platform 105 (e.g., GIRO D'ITALIA as depicted in FIGS. 9A and 9B).

Listing screens 900 and 930 typically may help depict and categorize athletes 450 for users to reference. Screen 900, as depicted in FIG. 9A, organizes potential picks 450 by team, depicted as real-life team roster 920. Such reference may, for example, be useful for users who wish to choose picks 450 from a club team that they hold allegiance to, a team including their favorite athlete 450, and/or the like. Users may also click or otherwise select athletes 450 to learn more about athletes 450, athlete 450's historical performance, athlete 450's training regimen, etc.

Event information 910 may also help to provide context for the real-world event itself, such as the current event plan, dates, geography, weather, timeline, and/or the like. Event information 910 may, for example, be useful to selecting one or more better picks 450 from teams having a better track record, that seem to be "up-and-coming," and/or the like. In other implementations, weather forecasts predicting high heat, rain, snow, and/or other adverse conditions may help influence user choices towards teams that may be more likely to perform better in those adverse conditions.

Similarly, country-athlete listing screen 930 typically may generate and display picks 450 by a pick 450's country. Real-life country-athlete listing 940 typically may be similar to roster 920, except as to the sorting order. Country-athlete listing screen 930 may help platform 105 users select picks 450 based on their country of origin, residence, and/or other preference. In other instances, where adverse conditions may come into play (e.g., high altitudes, extreme temperatures, etc.), selecting a pick 450 from a correspondingly adverse youth and/or training environment may be desirable (e.g., growing up and training in the mountains may give pick 450 a competitive edge in a mountainous section of a bike race).

Figure 10:
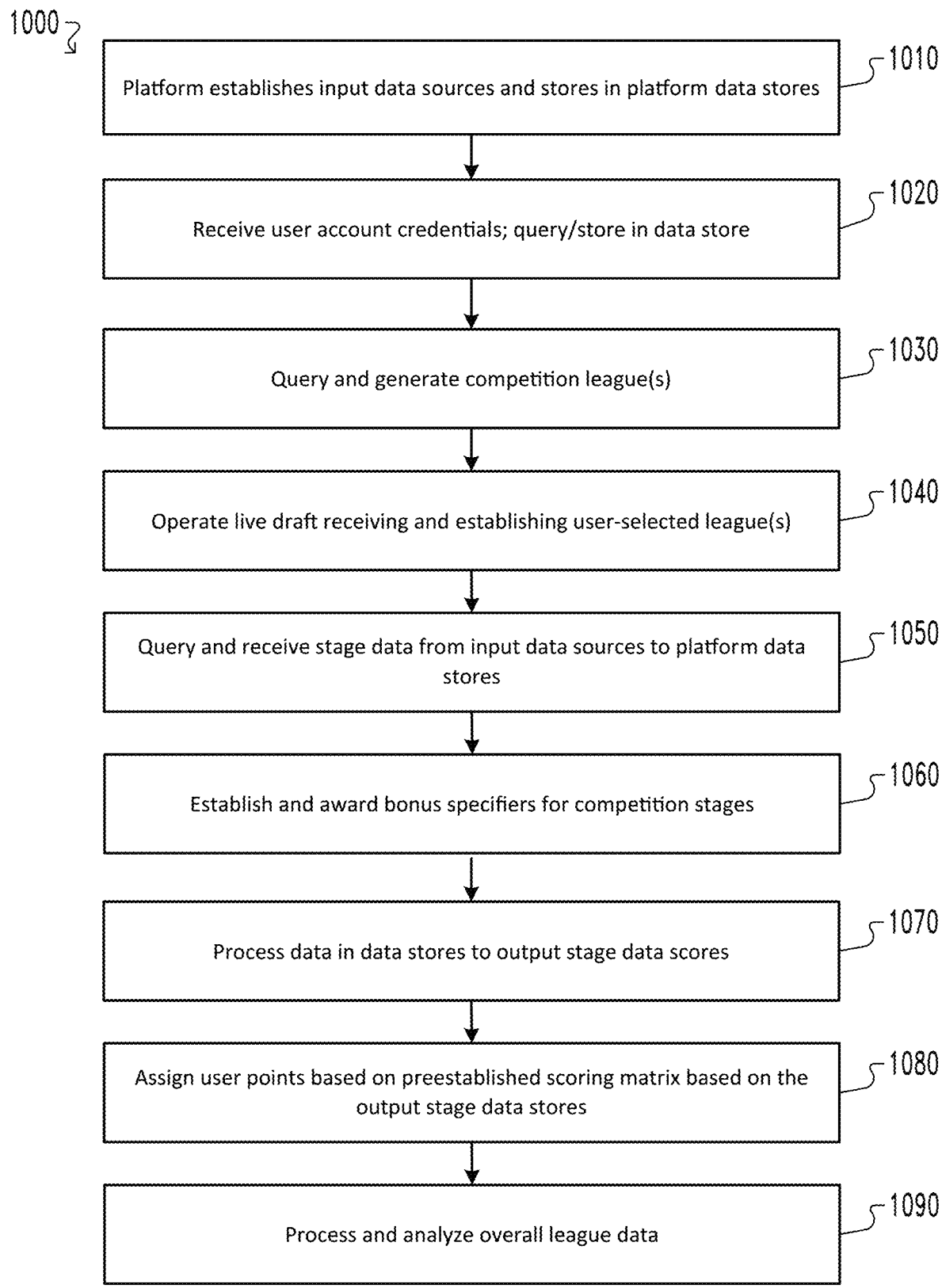
FIG. 10 depicts a first process flow chart associated with an implementation of the advanced fantasy sports platform.

FIGS. 10-17 depict process flows associated with sports platform 105. FIG. 10 depicts example high-level platform process flow 1000, which may include steps: platform establishes input data sources and stores in platform data stores 1010, receive user account credentials, query in data store or store in data store 1020, query and generate competition league(s) 1030, operate live draft receiving and establishing user-selected league(s) 1040, query and receive stage data from the input data sources to platform data stores 1050, establish and award bonus specifiers for competition stages 1060, process data in data stores to output stage data scores 1070, assign user points based on preestablished scoring matrix based on the output stage data stores 1080, and/or after set period of time, process and analyze overall league data 1090.

During platform establishes input data sources and stores in platform data stores 1010 step, system 105 typically may define, query, and/or connect to one or more input data sources, typically to connect and receive one or more resources 130 for use with system 105 as needed. For example, system 105 may have one or more connections via direct access, application programming interface (API), and/or the like.

These data sources (e.g., websites 115, resources 130) may, for instance, provide geographical information, upcoming weather condition data, historical weather condition data, historical sports performance data, current sports statistics and/or standings, current and/or predictive values for upcoming events, news sources for issues and/or health data, research articles relevant to system 105 analyses (e.g., statistical models, other sports competition analyses, substance analyses, and/or the like), and/or the like.

Further, during receive user account credentials, query in data store, and store in data store 1020 step, system 105 typically may receive input from one or more users 120 with one or more user account credentials. For example, such credentials may be a username, email, password, and/or the like. System 105 may then check system datastores 180 for matching credentials, provide secondary authentication features for access, reprompt on a nonmatch, prompt to create a new account on nonmatch, allow access on match, and/or the like. Such concepts are known in the art.

As platform 105 performs query and generate competition league(s) 1030 step, users 120 typically may be presented with one or more screens to search, join, and/or create user leagues 330. For example, such screens may be, but are not limited to, those depicted in FIG. 3 as league selection screen 300.

Such screens may allow a platform 105 user to search for user leagues 330, league events 350, other users on platform 105, and/or the like. For example, a new user to system 105 may search for TOUR DE FRANCE, the name of a user league including their friends, family, etc., the name of a coworker or family member, and/or the like. System 105 may then query datastores 180 and generate and display to the user potential results for user to browse and/or join.

In some instances, where a user may wish to create a league, such as for his or her workplace, family, etc., he or she may create a user league 330 by providing league information, other users to invite, and/or the like (further described elsewhere in this specification). System 105 may then populate this new league 330 for other users to query, browse, join, and/or the like.

During operate live draft receiving and establishing user-selected league(s) 1040 step, advanced sports platform 105 typically may generate and display to one or more users 120 in a user league 330 one or more screens, such as FIGS. 4A and 4B. These screens typically may serve to provide an efficient, interactive, and engaging "live draft" experience to users in user league 330.

For example, as depicted in FIG. 4A, live draft screen 400 may be generated and displayed to the teams in the user league 330 LE TOUR LEAGUE, namely as team listings 410 to the users owning user teams 415 "Rough Riders" and the "Spin Cycles." Other users 120 may be invited to join user league 330 using invite codes, links, and/or the like. For example, inviting other users to create user teams 415 may be accomplished using, but no limited to, invitation selector 420.

Such invitations typically may be allowed until a predetermined time prior to, and/or up to, the live draft for the user league 330. This predetermined time may be set per user league 330, per user league 330 group (e.g., where geographical, time-zoned, and/or otherwise multiple leagues 330 may compete), and/or over the entire platform 105 (e.g., all live drafts begin at 12 pm GMT and/or all teams 415 are locked at 12 pm GMT and the live draft begins at 6 pm GMT).

Once the predetermined time arrives, the teams 415 in user league 330 typically may be locked, and the live draft itself may begin. Each user team 415's one or more users 120 typically may be provided a roster (e.g., user team drafting listing 425) containing one or more selections (e.g., athletes 450 corresponding to selectors 430) to be made for the user team 415.

Each user team 415 may then typically be presented with one or more countdown timers (e.g., drafting timer 435) by which he or she must make a selection. This timer 435 typically may keep picks orderly, increase user turnout and preparation, decrease user lag, and provide for a much more engaging user experience by having more active users for the user league 330 live draft.

Typically, the order by which user teams 415 take turns in the live draft may be determined prior to the live draft. The order by which user teams 415 participate may be universally set on system 105, set on a per league 330 basis, and/or otherwise modified as desired. For example, teams 415 may go in order of their joining the user league 330, by number of points accrued on system 105 in past events, by activity on system 105, by investment to user league 330 and/or system 105, by alphabetical order of team name 417, by age of user, by random lot, and/or the like.

In some implementations, if a user is unresponsive as to their pick at the end of the timer 435 period, system 105 may autopick one or more selections 430 for the nonresponsive user team 415. For example, system 105 may query and assign the top-ranked remaining picks 450 based on current rankings derived from input data sources, query expected scores from data sources, query calculated aggregate scores across multiple data sources in data stores 180, and/or otherwise assign rankings based on algorithmic weighting of data in data stores 180 to create proprietary rankings. In other implementations, system 105 may assign the lowest-ranked picks, a random assignment of picks, and/or other desired pick schemes. Autopick schemes may, in some implementations, be universal across platform 105, universal across event types, personalized between user leagues 330, and/or the like.

Next, during query and receive stage data from the input data sources to platform data stores 1050 step, system 105 typically may query, receive, and store data from input data sources, typically from step 1010, for one or more stages of the event 350. For example, for a bike race having twenty-three parts/stages, system 105 may query each of these stages to receive data regarding the stage specifications (e.g., location, date, time, historical data, etc.). Thus, system 105 may determine that stage six will be a mountainous climb of one hundred and fifty-seven kilometers from Mulhouse to La Planche des Belles Filles, which will occur on Thursday, Jul. 11, 2019.

In addition to the specifications of the daily event, system 105 may also query and receive from other input data sources the expected weather conditions, previous comparable daily events, outcomes of those previous comparable daily events, current athletes 450 in contention to participate in the daily event, and/or the like.

At the end of the daily event, league event 350, and/or league 330, system 105 may again query, receive, and store data regarding outcomes (e.g., athlete ranking, athlete times, personal records, actual weather conditions, and/or the like). System 105 typically may them use this stored data to perform daily and/or overall league and user event calculations. Such calculations may include points, trends, unexpected results, statistically significant variations from expected and/or historical data, and/or the like. Some potential calculations are discussed elsewhere in this specification.

In some implementations, during establish and award bonus specifiers for competition stages 1060 step, system 105 may take into account one or more bonus specifiers for user leagues 330 and/or teams 415. For example, where a user selects that a particular athlete will place first, that a particular team will place in the top three places for the event 350, that a pick will return from a health condition, that a team will perform worse than expected, that a pick will break a personal record, that a team will break a world record, and/or the like, these selections may be assigned one or more point modifiers to augment a normal scoring schema.

For example, where a user normally may receive fifty points for a first-place pick, forty for second-place, thirty for third-place, but the user selected a particular athlete to place first with a bonus modifier, the user may then receive double, triple, or any other modifier for the normal fifty points. In other implementations, where a user picks the same athlete to maintain a streak of first-place finishes, or achieve a streak of honors over the course of a season, the points received may initially receive a bonus modifier of one, then one and a quarter, then one and a half, then two, and so on over the streak. Conversely, in some implementations, an incorrect pick and/or streak may negatively impact the user scoring. For example, an athlete injured in the first of twenty rounds, who was selected to place first for every round, may decrease the user's points received for each round.

Further, during process data in data stores to output stage data scores 1070 and system 105 assigns user points based on preestablished scoring scheme based on the output stage data stores 1080 steps, system 105 typically may take the stage data and/or the bonus modifiers, along with one or more scoring schema from the platform 105, league 330, and/or the like, and calculate each user's scoring based on this scoring schema.

For example, points may be awarded for, but are not limited to, selections finishing the stage in the top ten, for placing top ten in the overall classification, for placing top ten in the mountains classification, for placing top ten in the sprint classification, for placing top five in the team classification, for placing in the top five of the overall event, for placing top three in the mountains classification for the overall event, for placing top three in the sprint classification for the overall event, for placing top two in the team classification for the overall event, and/or the like.

Scoring schemas may vary by user league 330, event 350 type (e.g., car racing, biking, swimming, lacrosse, football, polo, and/or the like). For example, biking may assign points based on stages, football may assign match and/or round points, car racing may assign points based on laps and/or overall, and/or the like. Thus, each event 350 type and/or user league 330 may more personally define its preferences and scoring priorities.

After calculating, assigning, and storing user scores, system may then typically generate and display to users the calculated scores on one or more screens. Such an interface screen may be, for example, depicted on FIG. 5 as daily points screen 500. As described elsewhere in this specification, screen 500 may display team ranks 545, stage events 505, points 550, bonus modifier indicators 555, point differentials 560, and/or the like. Such screen 500 typically may allow users to more specifically analyze their teams 415's and their picks 450's performances.

Figure 11:
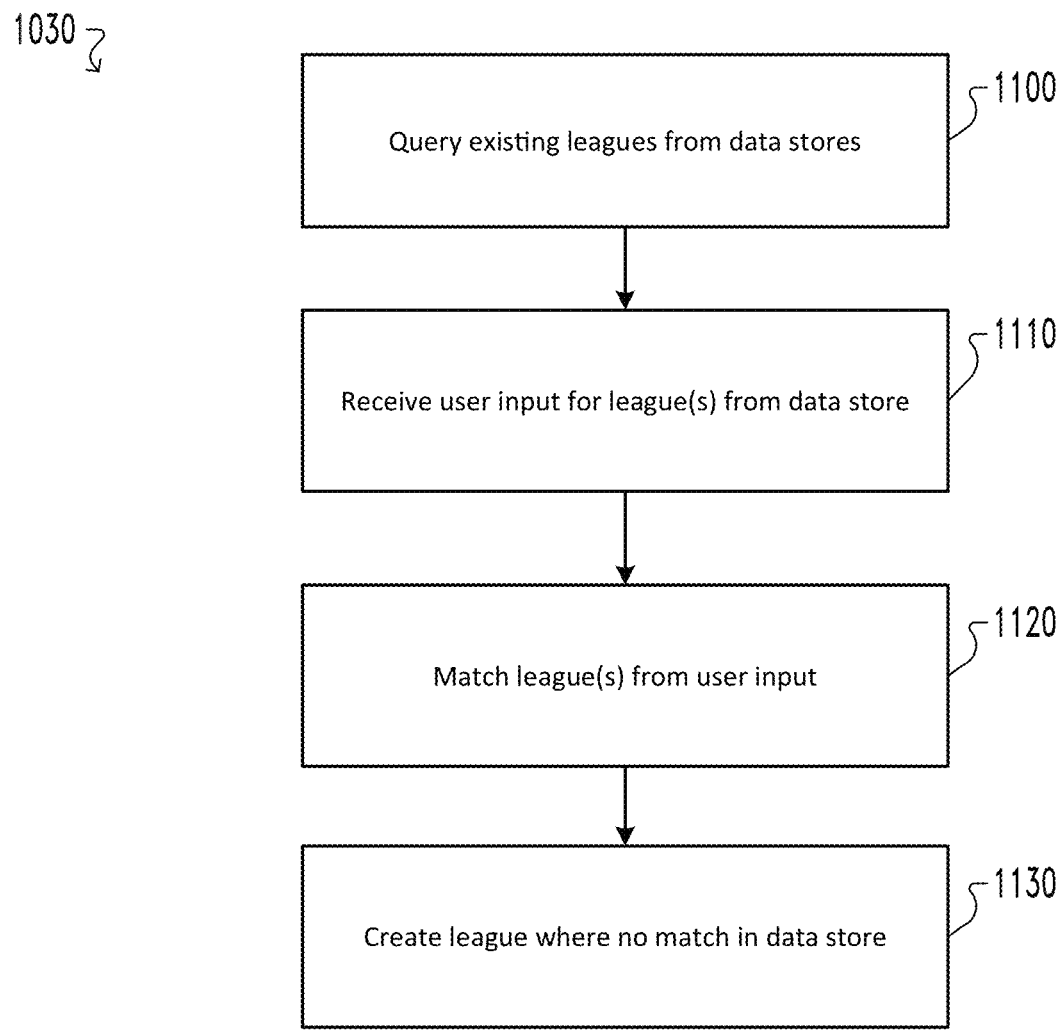
FIG. 11 depicts a second process flow chart associated with an implementation of the advanced fantasy sports platform.

Further, after set period of time, process and analyze overall league data 1090 step typically may be performed after conclusion of daily event, but in some implementations, may be performed during event 350. Such FIG. 11 depicts query and generate competition leagues 1030 step subflow, which typically may include steps: query existing leagues from data stores 1100, receive user input for league(s) from data store 1110, match league(s) from user input 1120, and/or create league where no match in data store 1130.

During query existing leagues from data stores 1100 step, system 105 typically may query datastores 180 on system 105 for existing leagues 330. These typically may be stored in one or more databases of datastores 180 with reference to other league information, identifiers, data sources, and/or the like.

During receive user input for league(s) from data store 1110 and match league(s) from user input 1120 steps, system 105 may receive one or more inputs for leagues (e.g., "The Atlas Work Group League") and then query datastores 180 for existing leagues 330. If one or more matching and/or similar results are found in datastores 180, system 105 typically may generate and display those results to the requesting user.

During create league where no match in data store 1130 step, in an instance where there is no match, or the user is instead attempting to create a new user league 330, system 105 may then receive the user's input for the new user league 330 identifying information, typically verify the new league 330's creation, and then store the new league for future querying and processing.

Figure 12:
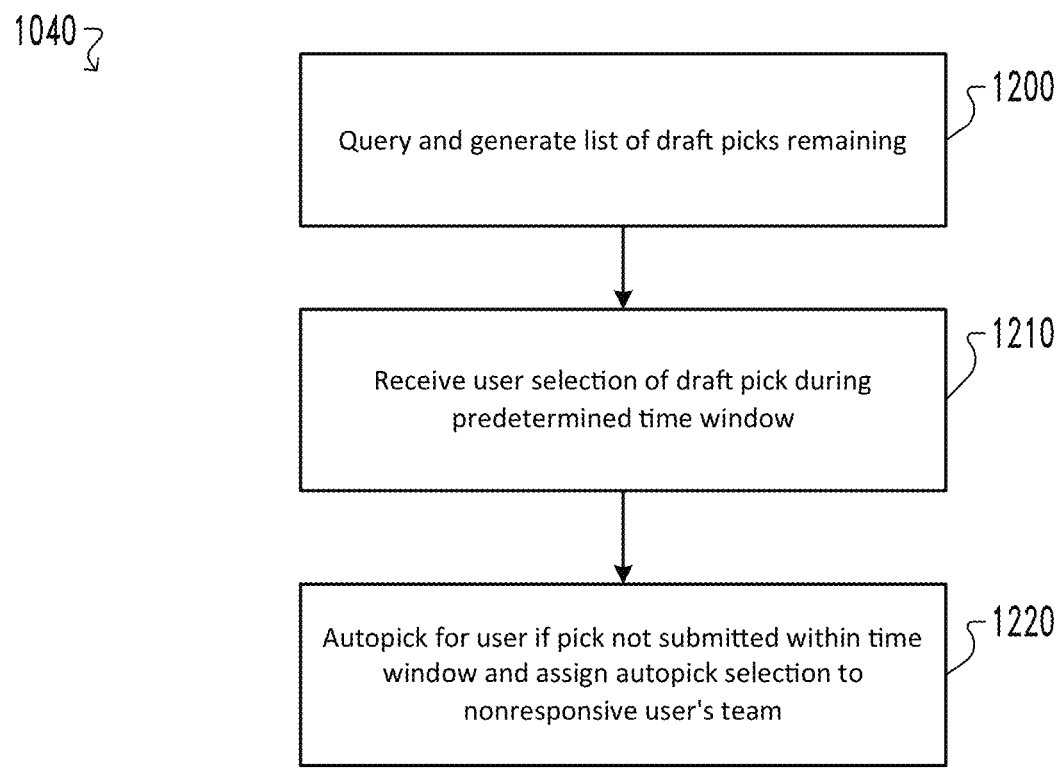
FIG. 12 depicts a third process flow chart associated with an implementation of the advanced fantasy sports platform.

FIG. 12 depicts live draft 340 step subflow, which may include steps: query and generate list of draft picks remaining 1200, receive user selection of draft pick during predetermined time window 1210, and/or autopick for user if pick not submitted within time window and assign autopick selection to nonresponsive user's team 1220.

During query and generate list of draft picks remaining 1200 step, system 105 typically may query datastores 180 for potential athletes 450 that are viable to compete in a future event 350. Athletes' 450 information typically may be queried, received, and stored from input data sources, and in some implementations may be referenced by users of system 105 before, during, and/or after event 350. For example, athletes 450 that may be participating in the 2019 TOUR DE FRANCE may be associated with said datastore 180 entry and returned by a user's query for athletes 450 participating in the 2019 TOUR DE FRANCE. This pick 450 result list typically may be sorted by rank, age, team, home country, position, and/or the like.

Once presented with the pick list 450, user may then enter and system 105 may receive user selection of draft pick during predetermined time window 1210 step, removing the need for system 105 to autopick for the user as being nonresponsive. For example, a user may select the first-ranked racer and the system 105 may receive said selection and associate the selection with the user team 415. System 105 may then typically denote for the user league 330 that the pick 450 is no longer available for the next users in the user league 330.

Then, in order to maintain the flow of the live draft process, platform 105 may perform autopick for user if pick not submitted within time window and assign autopick selection to nonresponsive user's team 1220 step. As described above, autopick schemas may be universal, semi-universal, and/or personalized, and timer 435 limit conditions that may also trigger autopick 1220 step.

Figure 13:
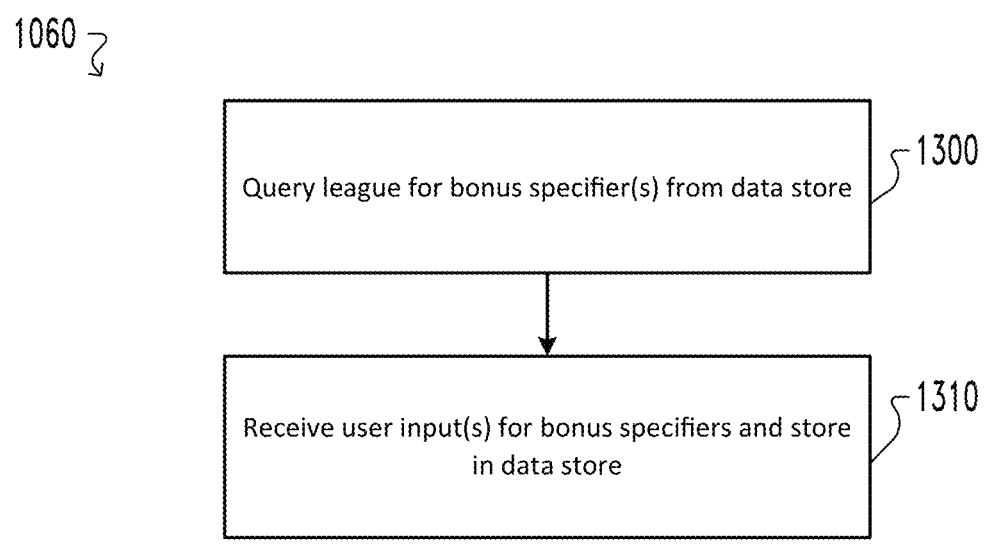
FIG. 13 depicts a fourth process flow chart associated with an implementation of the advanced fantasy sports platform.

FIG. 13 depicts bonus specifiers 1060 step subflow, which may include steps: query league for bonus specifier(s) from data store 1300, and/or receive user input(s) for bonus specifiers and store in data store 1310.

During query league for bonus specifier(s) from data store 1300, system 105 typically may query datastores 180 for one or more bonus specifier(s) associated with user league 330 and/or user team 415. For example, a user league 330 may only allow a single, doubling modifier for user teams 415 in the league 330, whereas another user league 330 may allow more than one type of bonus modifier for each user team 415 in the league 330 (e.g., stage, overall, streak, and/or the like).

Further the receive user input(s) for bonus specifiers and store in data store 1310 step, which typically may be performed on screen 700, system 105 receives user selections for bonus modifiers. As depicted in FIG. 7, this may be by clicking a button, selecting a modifier from a dropdown, and/or other selection routines.

Figure 14:
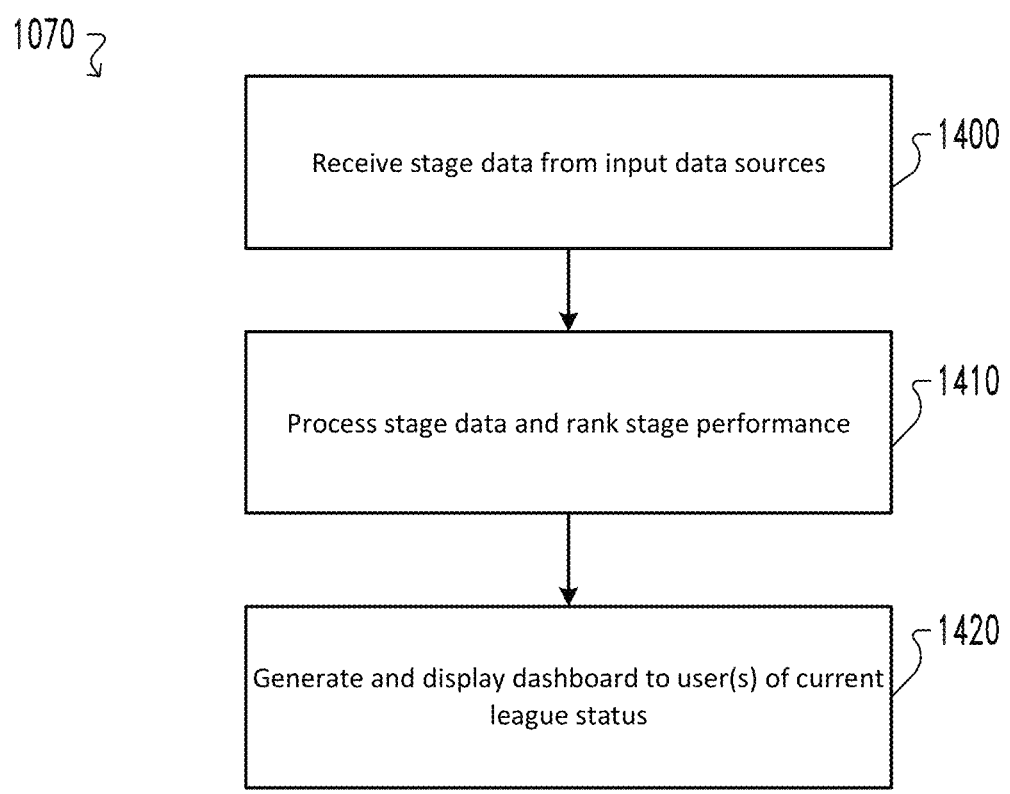
FIG. 14 depicts a fifth process flow chart associated with an implementation of the advanced fantasy sports platform.

FIG. 14 depicts output stage data processing 1070 step subflow, which may include steps: receive stage data from input data sources 1400, process stage data and rank stage performance 1410, and/or generate and display dashboard to user(s) of current league status 1420.

During receive stage data from input data sources 1400 step, system 105 typically may query datastore 180 for input data sources associated with league event 350, user team 415, and/or user league 330. System 105 may then query, receive, and/or store data returned from input data source relevant to one or more queries. For a daily event, such queries may be the stage, location, time, competitors, and/or the like, while for overall events 350, such queries may be the event name, year, and/or the like. Stage data typically may be athlete times, points scored, ranking, inclusion/exclusion, records, and/or the like.

After receiving data in 1400 step, platform 105 may perform process stage data and rank stage performance 1410 step to further match and sort stage data from input data sources. For example, such processing may include normalizing, averaging, and/or otherwise conforming input source data. In some implementations, this may also include converting values and/or units (e.g., between imperial, metric, and/or the like) such that values in data store 180 that may be used for analysis do not inherently corrupt the data set. Once the data is normalized, if normalization is necessary, then system 105 may rank athlete 450 performance based on the input data. For example, such ranking may be based on time, points, placement, actual:expected placement, and/or the like. These rankings then may be associated with the event 350 subpart, user leagues 330, and/or user teams 415.

Further platform 105 may then perform generate and display dashboard to user(s) of current league status 1420 step. This dashboard typically may be depicted by, but is not limited to, those depicted in FIGS. 6-8, which are described elsewhere in this specification.

Figure 15:
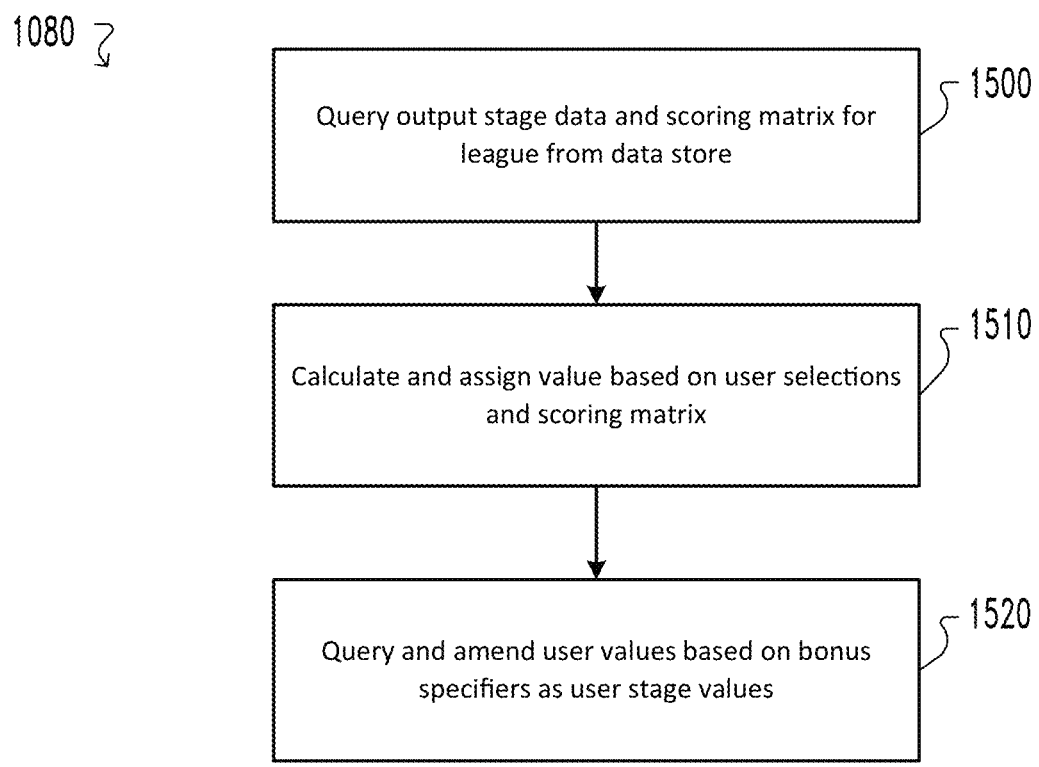
FIG. 15 depicts a sixth process flow chart associated with an implementation of the advanced fantasy sports platform.

FIG. 15 depicts scoring matrix 1080 step subflow, which may include steps: query output stage data and scoring matrix for league from data store 1500, calculate and assign value based on user selections and scoring matrix 1510, and/or query and amend user values based on bonus specifiers as user stage values 1520.

During query output stage data and scoring matrix for league from data store 1500 step, system 105 typically may query datastores 180 for one or more scoring schemas associated with the event 350 and/or user league 330. System 105 may then query datastores 180 to map the one or more scoring schema elements to one or more stored output data sets in datastores 180, which may then be used for calculation and scoring of the user teams 415 and/or user leagues 330 at event 350 subparts (e.g., stages, rounds, etc.).

After querying 1500 step, platform 105 typically may perform calculate and assign value based on user selections and scoring matrix 1510 and query and amend user values based on bonus specifiers as user stage values 1520 steps. System 105 typically may use output stage data, amended by bonus modifiers, to calculate and assign user team 415 scores and/or ranks accordingly for stages. These stage values are then associated with users and the respective user teams 415 and leagues 330. Such steps may be performed automatically, semi-automatically, and/or manually, depending on universal, semi-universal, and/or per-league preferences. These stage values and rankings may then be calculated and stored for query and future reference in datastores 180.

Figure 16:
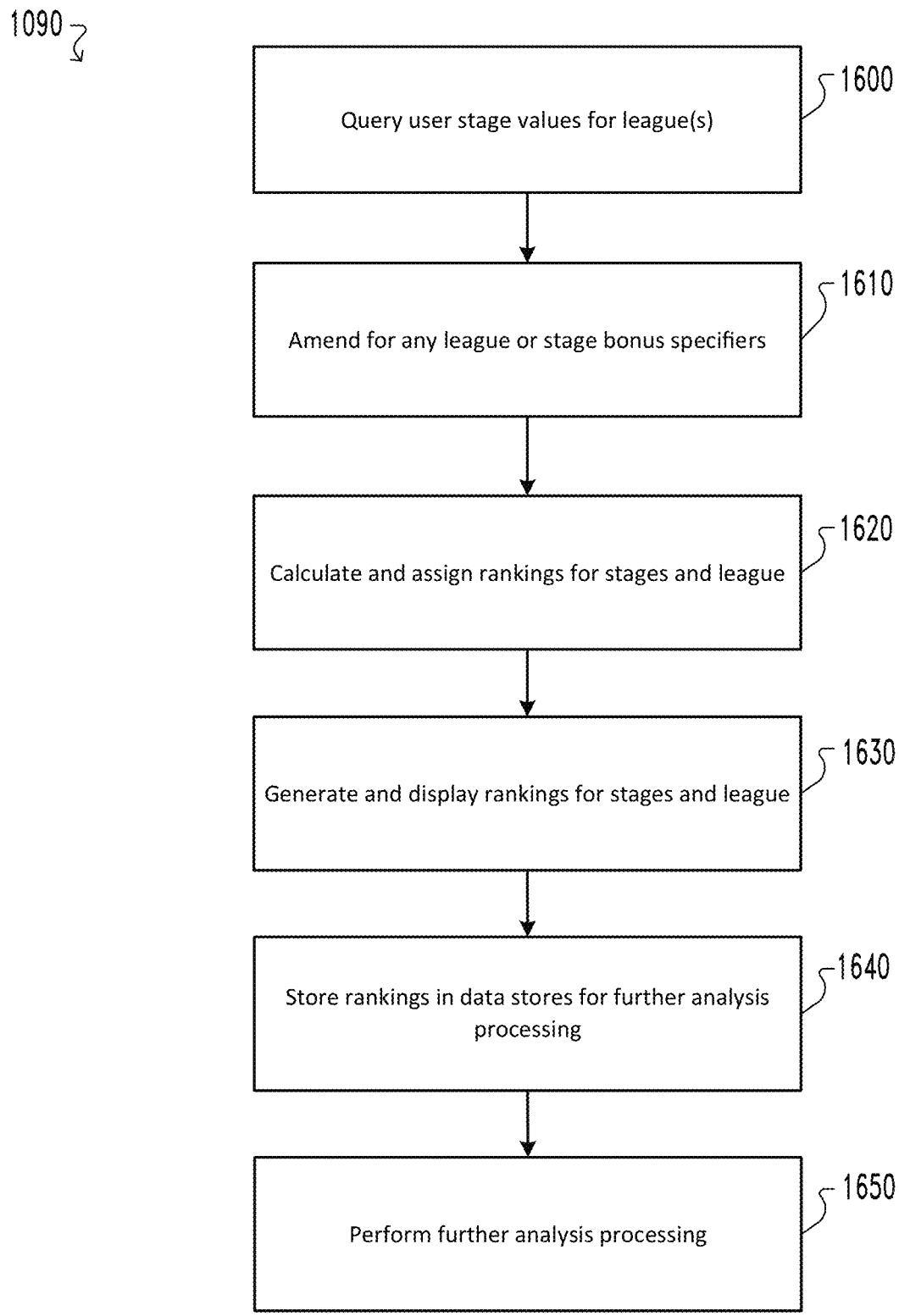
FIG. 16 depicts a seventh process flow chart associated with an implementation of the advanced fantasy sports platform.

FIG. 16 depicts process overall data 1090 step subflow, which may include steps: query user stage values for league(s) 1600, amend for any league or stage bonus specifiers 1610, calculate and assign rankings for stages and league 1620, generate and display rankings for stages and league 1630, store rankings in data stores for further analysis processing 1640, and/or perform further analysis processing 1650.

During query user stage values for league(s) 1600 step, platform 105 typically may query calculated and stored user stage values from datastores 180, which typically may be stored in steps 1510 and 1520. After querying user stage values in 1600 step, system 105 may execute amend for any league or stage bonus specifiers 1610 step. This amendment 1610 step typically may amend the stored user scores and/or ranks based on further bonus modifiers that affect the league 330 and/or event stage specifically. For example, a user may be awarded a bonus for being most improved from the beginning to the end of the league 330, for receiving the most bonuses over the course of league 330, for inviting the most users to league 330, and/or the like. In some implementations, such bonuses may be set by the platform 105, league 330, and/or users themselves.

During calculate and assign rankings for stages and league 1620 step, system 105 queries and calculates rankings for the user teams 415 of leagues 330, applying bonus modifiers if necessary, and then ranking teams 415 and leagues 330. Such ranking typically may be based on overall score, but in other implementations may be based on average stage score, specific substage event type (e.g., flats, mountains, semi-finals, finals, etc.) scores, historical score improvement, and/or the like.

Further, during generate and display rankings for stages and league 1630 and store rankings in data stores for further analysis processing 1640 steps, system 105 may then take the calculated and assigned rankings, and generate and display the rankings on platform 105 for leagues 330 and user teams 415. In some implementations, system 105 may contact users with notifications (e.g., text message, email, phone call, etc.) of such finalized scores and rankings. In some further implementations, rankings and scores may be public on the platform, public to a selected subset of users (e.g., those in same geographic area, age bracket, country, etc.), or remain private to members of the user league 330.

Additionally, in some implementations, system 105 may then execute perform further analysis processing 1650 step to gain further information regarding trends in the collected and/or expected data. Such additional processing and analysis typically may act to tease out further differences and trends than may be understood with a day-by-day or event-by-event reference, and are further described elsewhere in this specification.

Figure 17:
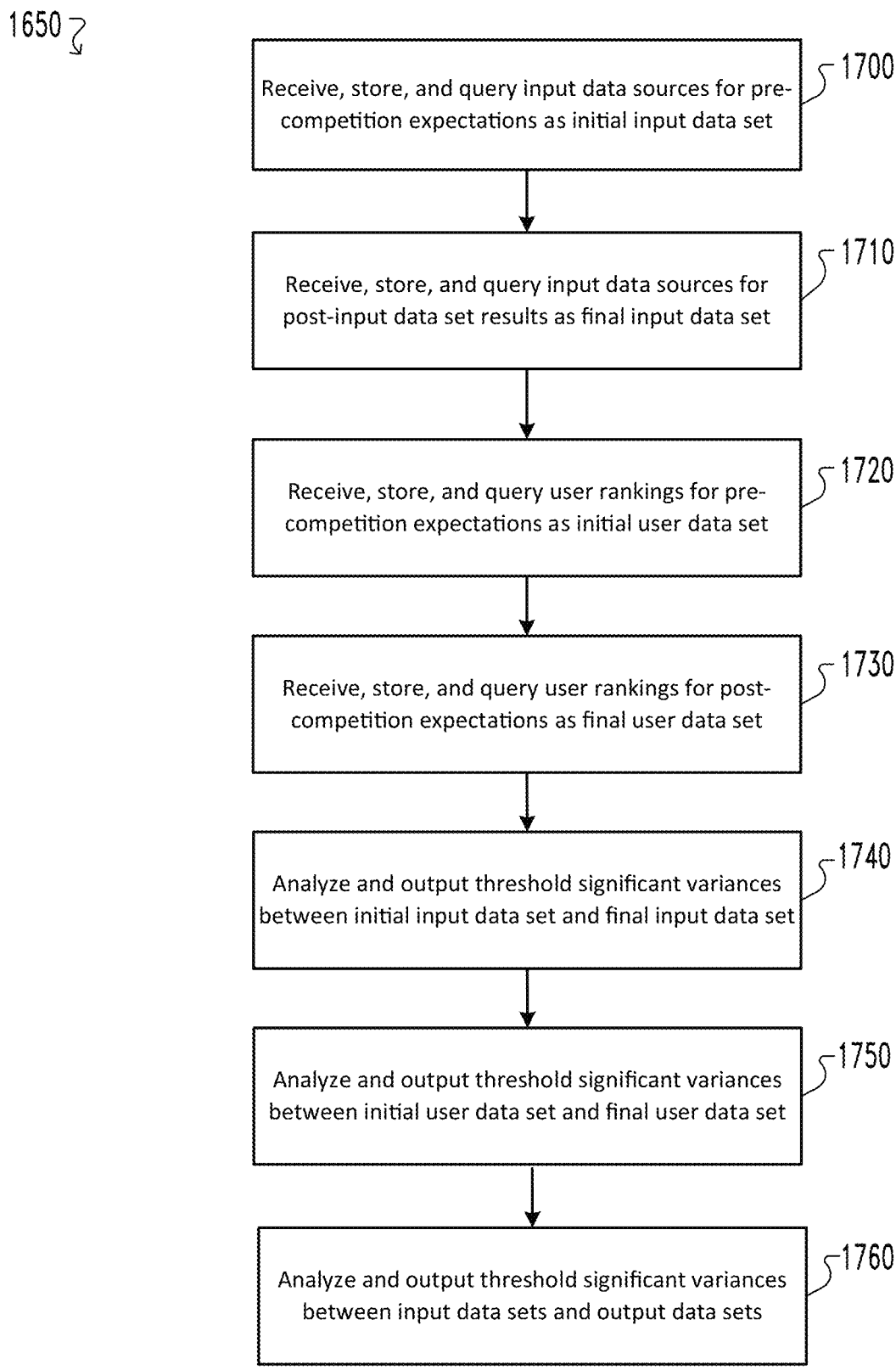
FIG. 17 depicts an eighth process flow chart associated with an implementation of the advanced fantasy sports platform.

FIG. 17 depicts further analysis processing 1650 step subflow, which may include steps: receive, store, and query input data sources for pre-competition expectations as initial input data set 1700, receive, store, and query input data sources for post-competition data set results as final input data set 1710, receive, store, and query user rankings for pre-competition expectations as initial user data set 1720, receive, store, and query user rankings for post-competition expectations as final user data set 1730, analyze and output threshold significant variances between initial input data set and final input data set 1740, analyze and output threshold significant variances between initial user data set and final user data set 1750, and/or analyze and output threshold significant variances between initial input data set and final input data set 1760. Such additional processing and analysis typically may act to tease out further differences and trends than may be understood with a day-by-day or event-by-event reference.

During receive, store, and query input data sources for pre-competition expectations as initial input data set 1700 step, system 105 typically may evaluate and normalize initial input data for one or more competition events 350. For example, such initial input data may include, but is not limited to, expected scores, expected times, expected winners, expected placements, and/or the like. Such information is often based on historical and/or "expert" analysis from individuals knowledgeable of the competition event 350, and thus may be useful in determining an "expert's opinion" for such expectations for comparison with platform 105 user expectations and actual outcomes.

Further, during receive, store, and query input data sources for post-competition data set results as final input data set 1710 step, system 105 typically may evaluate and normalize final competition data for one or more competition events 350. For example, such final data may include, but is not limited to, actual scores, actual times, actual winners, actual placements, and/or the like. Again, such data is vital to comparison against expected results.

After input data set 1710 step, system 105 similarly may perform receive, store, and query user rankings for pre-competition expectations as initial user data set 1720 step and receive, store, and query user rankings for post-competition expectations as final user data set 1730 step for platform 105 user expectations. Such data may be useful in determining a "popular" or "community" expectation, which may or may not vary from the "expert" expectation. Such community data again is useful for comparing to expected values and actual values for analysis and processing.

In some implementations, system 105 may perform analyze and output threshold significant variances between initial input data set and final input data set 1740 step. System 105 thus may utilize the data in datastores 180 to analyze whether variances between the expected "expert" values and the actual outcome values. This, for example, may provide insight into whether experts overlooked one team or athlete in favor of another, whether an athlete's historical performance is not keeping pace with expected trends, and/or whether an athlete or team's performance is significantly divergent from expected expert trends.

In some more implementations, system 105 may perform analyze and output threshold significant variances between initial user data set and final user data set 1750 step. Similarly, for example, this may provide insight into whether a community as a whole is more in-tune with their favorite teams or athletes (e.g., by tendency toward the mean of opinions), whether the community as a whole overlooked one team or athlete in favor of another, whether the community's expectations deviate from "expert" presumptions, whether a team or athlete's historical performance is not keeping pace with community-expected trends, and/or whether an athlete or team's performance is significantly divergent from expected community trends. Trends within the community, such as changing bonus modifiers between picks 450, betting against an incumbent pick 450, and/or the like as an event 350 progresses may also depict cumulative changes in attitudes and/or environment that may otherwise go unnoticed in a smaller "expert" sample.

In some further implementations, system 105 may perform analyze and output threshold significant variances between input data sets and output data sets 1760 step. Comparing input to output data sets as a whole may, in some implementations, allow for a normalized view of expectation as a whole for one or more events 350. For example, while experts and the community may provide insight into whether a community as a whole is more in-tune with their favorite teams or athletes (e.g., by tendency toward the mean of opinions), whether the community as a whole overlooked one team or athlete in favor of another, whether the community's expectations deviate from "expert" presumptions, whether a team or athlete's historical performance is not keeping pace with community-expected trends, and/or whether an athlete or team's performance is significantly divergent from expected community trends.

By way of nonlimiting example, platform 105 provides benefits over prior art systems by increasing retention of users on platform 105, increasing immersion with live draft process, increasing participation with live draft process, lowering barriers to entry to new virtual fantasy sports users, opening the virtual fantasy sports scope to allow for lower popularity competitions to be available to users, and improving the quantity, and thus critical mass, of lower popularity competition users to create the first effective and engaging platform 105 for such competitions.

By way of nonlimiting example, advanced virtual sports platform 105 may be established on one or more servers accessible to one or more users and user devices 120 over one or more networks 110. Platform 105 typically may maintain one or more datastores 180, which may contain platform 105 data, input source data, user data, event 350, user league 330 data, user team 415 data, athlete 450 data, daily event 505 data, bonus modifier data, roster data, processing and analysis data, and/or the like.

Platform 105 and or users 120 may create one or more league events 350, which have one or more associated user leagues 330, which in turn have one or more user teams 415, which in turn have one or more rosters, which in turn have one or more picked athletes 450, which in turn have one or more athlete data 620, etc.

For example, platform 105 may create a 2019 TOUR DE FRANCE league event 350, establishing one or more input data sources from websites and databases having stage data, rider information, historical TOUR DE FRANCE data, expected rankings and/or winners, team data, and/or the like. One or more users 120 may then create one or more user leagues 330 (e.g., "League A," "League B," "League C," etc.), which system 105 may receive and store, along with user league 330 information (e.g., user league name 340, participants 360, invite code, confirmation code, etc.).

One or more other users 120 may search platform 105 for user leagues 330 associated with event 350, join a found user league 330, and/or create their own user leagues 330. Users may join user leagues 330 immediately, after confirmation, after entering an invite code, and/or the like. Users may create one or more user teams 415 with one or more team 415 identifiers (e.g., team name 417, team mascot, team picture, team motto/slogan, etc.). Each team may be associated with one or more platform 105 users.

At a predetermined time—the time being set universally, per event 350, by event 350 type, and/or by league 330—leagues 330 commence a live draft process to select athletes 450 for their teams 415. Team 415 picking order may be decided by seniority, name, interaction/investment to platform 105, join date, random, and/or the like. Each team 415 may be presented with a countdown timer 435, which forces users to select one or more picks 450 for their team 415 within the time limit of the timer 435. Nonresponsive and/or lagging users who do not make their picks in the allotted time may trigger system 105 to autopick selections 450 for the nonresponsive user team 415. Such autopick may be done randomly, by input data source ranking, by platform 105 computed ranking, and/or the like. Draft process typically may continue until all user teams 415 are full and/or all picks 450 are exhausted.

In some implementations, one or more bonuses may be selected by teams 415 to augment scoring accumulated by their picks 450. For example, bonuses could multiply the daily stage score, scale with streaks, negate scores for poor choices, and/or the like.

As event 350 progresses (e.g., via stages, days, etc.), system 105 may communicate with input data sources to receive real-time updates and data of event 350, such as scores, stage rank, current weather conditions, weather forecast, athlete 450 health, and/or the like. System 105 may then use this input stage data to score user teams 450 and user leagues 330 based on one or more scoring rubrics associated with platform 105, event 350, and/or league 330. Teams 415 and/or leagues 330 may then be ranked by scoring, and such scores and rankings may be generated and displayed to users on platform 105. These processes may continue throughout event 350, until event 350 concludes, at which point system 105 tabulates, amends, and displays final scores, ranks, awards, and/or the like for event 350, leagues 330, teams 415, athletes 450, and/or the like.

Either during or following event 350, system 105 may also perform analyses based on collected data. Such analyses may, for example, determine that "Athlete A" is doing far worse than expected after a recent surgery, possibly predicting an upset, further surgery being necessary, etc.; that "Athlete B" is doing far better than expected, possibly indicating more effective preparation, intrinsic motivations not otherwise seen, substance use, etc.; that "Team Z," which may include "Athlete B" is performing far better than expected, which may indicate the need for increased scrutiny, possible team-wide substance usage, and/or the like.

Such data comparison may also help depict trends over time of athlete improvement, decline, recovery, and/or the like that may not otherwise be contemplated. Further, such data may help determine inherent biases between "experts" and the platform 105 community, which may indicate need for further exploration, modification of real-world standards, insider knowledge of certain individuals, and/or the like.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A method for establishing an advanced virtual sports platform over a computer network, comprising the steps of:
    establishing at least one input data source associated with at least one real-world cycling competition and storing the at least one input data source in platform datastore;
    wherein the at least one real-world cycling competition comprises a plurality of discrete successive stages, wherein each of the discrete successive stages has a different terrain;
    receiving user account credentials from at least one user, querying for the user account credentials existing in the platform datastore, and storing the user account credentials in the platform datastore;
    querying and generating at least one competition user league associated with at least one real-world cycling competition;
    receiving and storing at least one user team associated with the at least one competition user league;
    operating a live draft for the at least one competition user league and the at least one user team, wherein each of the at east one user teams selects at least one athlete from a user interface during a predetermined time period, wherein the predetermined time period is displayed to the at least one user on the user interface during the live draft, and wherein upon expiration of the predetermined time period the platform autopicks the at least one athlete for the at least one user team;
    querying and receiving stage data associated with at least one of the discrete successive stages of the at least one real-world cycling competition from the at least one input data source to the platform datastore;
    establishing at least one bonus specifier for the at least one of the discrete successive stages of the at least one competition user league;
    processing data in the platform datastore and outputting stage data scores as output stage data scores wherein multiple sets of data are processed simultaneously;
    wherein scoring criteria changes as an athlete passing into a new terrain;

27 assigning the at least one user team at least one point score based on the output stage data scores;
assigning at least one athlete at least one point score based on the output stage data scores;
generating at least one ranking for the at least one user team based on the output stage data scores;
generating at least one ranking for the at least one athlete based on the output stage data scores; and
calculating and displaying rankings and points accrued for tracking competitive rankings for the at least one user team and the at least one athlete.

2. The method of claim 1, further comprising the step of:
processing and analyzing data from the platform datastore for statistically significant variations trends.

3. The method of claim 1, wherein assigning the at least one point score is further based on at least one predetermined scoring rubric associated with the at least one user league.

4. The method of claim 1, wherein when the platform autopicks the at least one athlete for the at least one user team, the autopick is biased toward selecting the at least one athlete with a highest rank value from the platform datastore.

5. The method of claim 1, wherein operating a live draft further comprises the steps of:
querying and generating a list of draft picks from the at least one athlete; and
receiving at least one user selection from the list of draft picks during the predetermined time period.

6. The method of claim 1, further comprising the steps of:
receiving, storing, and querying the at least one input data source for pre-competition expectations as an initial input data set;
receiving, storing, and querying the at least one input data source for post-competition data set results as a final input data set;
receiving, storing, and querying at least one user rankings from the platform datastore for pre-competition expectations as initial user data set;
receiving, storing, and querying at least one user rankings from the platform datastore for post-competition expectations as final user data set;
analyzing and outputting statistically significant variances between the initial input data set and the final input data set; and
analyzing and outputting statistically significant variances between initial user data set and final user data set.

7. The method of claim 6, further comprising the step of:
analyzing and outputting statistically significant variances between the initial input data set and the initial user data set; and
analyzing and outputting statistically significant variances between final input data set and final user data set.

8. A system for providing an advanced virtual sports platform configured to operate over a network using a server, a client, and a plurality of end-users, comprising:
a server operating the advanced virtual sports platform system, the server adapted to communicate with the network, wherein the server is configured to:
establish at least one input data source associated with at least one real-world cycling competition and store the at least one input data source in a platform datastore;
wherein the at least one real-world cycling competition comprises a plurality of discrete successive stages, wherein each of the discrete successive stages has a different terrain;

28 receive user account credentials from at least one user, query for existing user account credentials in the platform datastore, and store the user account credentials in the platform datastore;
query and generate at least one competition user league associated with at least one real-world cycling competition;
receive and store at least one user team associated with the at least one competition user league;
operate a live draft for the at least one competition user league and the at least one user team, wherein each of the at least one user teams selects at least one athlete from a user interface during a predetermined time period, wherein the predetermined time period is displayed to the at least one user on the user interface during the live draft, and wherein upon expiration of the predetermined time period the platform autopicks the at least one athlete for the at least one user team;
query and receive stage data associated with at least one subpart of the at least one real-world cycling, competition from the at least one input data source to the platform datastore;
establish at least one bonus specifier for the at least one discrete successive stage of the at least one competition user league;
process data in the platform datastore and output stage data scores, wherein multiple sets of data are processed simultaneously;
wherein scoring criteria changes as an athlete passing into a new terrain;
assign the at least one user team at least one point score based on the output stage data scores;
assign the at least one athlete at least one point score based on the output stage data scores;
generate at least one ranking for the at least one user team based on the output stage data scores;
generate at least one ranking for the at least one athlete based on the output stage data scores; and
calculate and display rankings and points accrued for the at least one user team and the at least one athlete.

9. The system of claim 8, further comprising the step of:
process and analyze data from the platform datastore for statistically significant variations trends.

10. The system of claim 8, wherein assigning the at least one point score is also based on at least one predetermined scoring rubric associated with the at least one user league.

11. The system of claim 8, wherein when the platform autopicks the at least one athlete for the at least one user team, the autopicking is biased toward selecting the at least one athlete with a highest rank value from the platform datastore.

12. The system of claim 8, wherein operating a live draft further comprises the steps of:
querying and generating a list of draft picks from the at least one athlete; and
receiving at least one user selection from the list of draft picks during the predetermined time period.

13. The system of claim 8, further comprising the steps of:
receiving, storing, and querying the at least one input data source for pre-competition expectations as an initial input data set;
receiving, storing, and querying the at least one input data source for post-competition data set results as a final input data set;
receiving, storing, and querying at least one user rankings from the platform datastore for pre-competition expectations as initial user data set;

receiving, storing, and querying at least one user rankings from the platform datastore for post-competition expectations as final user data set;

analyzing and outputting statistically significant variances between the initial input data set and the final input data set; and analyzing and outputting statistically significant variances between initial user data set and final user data set.

14. The system of claim 13, further comprising the step of:

analyzing and outputting statistically significant variances between the initial input data set and the initial user data set; and analyzing and outputting statistically significant variances between final input data set and final user data set.

15. A system for establishing an advanced fantasy sports platform operating over a network using a server, a client, and a plurality of end-users, comprising:

a server operating the advanced fantasy sports platform system, the server adapted to communicate with the network, wherein the server is configured to:

establish at least one input data source associated with at least one real-world cycling competition and store the at least one input data source in platform datastore;

wherein the at least one real-world cycling competition comprises a plurality of discrete successive stages, wherein each of the discrete successive stages has a different terrain;

receive user account credentials from at least one user, query for existing user account credentials in the platform datastore, and store the user account credentials in the platform datastore;

query and generate at least one competition user league associated with at least one real-world cycling competition;

receive and store at least one user team associated with the at least one competition user league, operate a live draft for the at least one competition user league and the at least one user team, wherein each of the at least one user teams selects at least one cyclist from a user interface during a predetermined time period, wherein the predetermined time period is displayed to the at least one user on the user interface during the live draft, and wherein upon expiration of the predetermined time period the platform autopicks the at least one cyclist for the at least one user team;

query and receive stage data associated with the discrete successive stages at least one daily stage of the at least one real-world cycling competition from the at least one input data source to the platform datastore;

establish at least one bonus specifier for the at least one discrete successive stages of the at least one competition user league;

process data in the platform datastore and output stage data scores, wherein multiple sets of data are processed simultaneously;

wherein scoring criteria changes as an cyclist passing into a new terrain;

assign the at least one user team a point value based on the output stage data scores;

assign the at least one cyclist at least one point score based on the output stage data scores;

generate at least one ranking for the at least one user team based on the output stage data scores;

generate at least one ranking for the at least one cyclist based on the output stage data scores; and calculate and display rankings and points accrued for tracking competitive rankings for the at least one user team and the at least one cyclist.

16. The system of claim 15, further comprising the step of:

process and analyze data from the platform datastore for statistically significant variations trends.

17. The system of claim 15, wherein assigning the point value is further based on at least one predetermined scoring rubric associated with the at least one user league.

18. The system of claim 15, wherein when the platform autopicks the at least one cyclist for the at least one user team, the autopicking is biased toward selecting the at least one cyclist with a highest weighted rank from the platform datastore.

19. The system of claim 15, wherein operating a live draft further comprises the steps of:

querying and generating a list of draft picks from the at least one cyclist; and receiving at least one user selection from the list of draft picks during the predetermined time period.

20. The system of claim 15, further comprising the steps of:

receiving, storing, and querying the at least one input data source for pre-competition expectations as an initial input data set;

receiving, storing, and querying the at least one input data source for post-competition data set results as a final input data set;

receiving, storing, and querying at least one user rankings from the platform datastore for pre-competition expectations as initial user data set;

receiving, storing, and querying at least one user rankings from the platform datastore for post-competition expectations as final user data set;

analyzing and outputting statistically significant variances between the initial input data set and the final input data set;

analyzing and outputting statistically significant variances between initial user data set and final user data set;

analyzing and outputting statistically significant variances between the initial input data set and the initial user data set; and analyzing and outputting statistically significant variances between final input data set and final user data set.

* * * * *